US012053948B2

(12) United States Patent
Fakhouri et al.

(10) Patent No.: US 12,053,948 B2
(45) Date of Patent: Aug. 6, 2024

(54) CUSHIONING MEMBER FOR ARTICLE OF FOOTWEAR AND RELATED METHODS

(71) Applicant: NIKE, Inc., Beaverton, OR (US)

(72) Inventors: Sami Fakhouri, Portland, OR (US); Cassidy R. Levy, West Linn, OR (US); Brian Prevo, Portland, OR (US); Pei-Jyun Lin, Taichung (TW); Ping-Hung Tsai, Chang Hwa (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/056,116

(22) Filed: Nov. 16, 2022

(65) Prior Publication Data
US 2023/0079560 A1 Mar. 16, 2023

Related U.S. Application Data

(63) Continuation of application No. 16/427,527, filed on May 31, 2019, now Pat. No. 11,529,783.

(60) Provisional application No. 62/678,464, filed on May 31, 2018.

(51) Int. Cl.
*B29D 35/00* (2010.01)
*A43B 13/04* (2006.01)
(Continued)

(52) U.S. Cl.
CPC .......... *B29D 35/0054* (2013.01); *A43B 13/04* (2013.01); *A43B 13/187* (2013.01);
(Continued)

(58) Field of Classification Search
CPC ............ B29C 66/3521; B29C 66/7352; B29C 61/006; B29C 2043/5808; B29C 43/52; B29C 43/02; B29C 43/003
See application file for complete search history.

(56) References Cited

U.S. PATENT DOCUMENTS 11,529,783 B2 * 12/2022 Fakhouri .............. B29D 35/122
2007/0199210 A1 8/2007 Vattes et al.
(Continued)

FOREIGN PATENT DOCUMENTS

CN 105073363 A 11/2015
CN 105793008 A 7/2016
(Continued)

OTHER PUBLICATIONS

European Patent Office (ISA), International Search Report and Written Opinion for International Application No. PCT/US2019/034854, mailed Sep. 18, 2019.
(Continued)

*Primary Examiner* — Stella K Yi
(74) *Attorney, Agent, or Firm* — Honigman LLP; Matthew H. Szalach; Jonathan P. O'Brien

(57) ABSTRACT

A method of forming a polymeric foam material is provided and includes providing a precursor material having a first thickness, the precursor material being an open-cell foam material and applying a uniaxial compressive force to the precursor material to compress the precursor material to a second thickness, the compressive force causing a cell structure of the precursor material to collapse. The method also includes heating the precursor material at a molding temperature for a first time period while the compressive force is applied, the first time period being sufficient to heat the precursor material to a softening temperature, removing the compressive force from the precursor material, and maintaining the cell structure of the precursor material in a collapsed state.

17 Claims, 17 Drawing Sheets

(51) Int. Cl.
*A43B 13/18* (2006.01)
*B29C 43/00* (2006.01)
*B29C 43/02* (2006.01)
*B29C 43/52* (2006.01)
*B29D 35/12* (2010.01)
*B29K 75/00* (2006.01)
*B29K 105/04* (2006.01)

(52) U.S. Cl.
CPC ............ *B29C 43/003* (2013.01); *B29C 43/02* (2013.01); *B29C 43/52* (2013.01); *B29D 35/122* (2013.01); *B29K 2075/00* (2013.01); *B29K 2105/04* (2013.01)

(56) References Cited

U.S. PATENT DOCUMENTS

| | | |
|---|---|---|
| 2010/0029796 A1 | 2/2010 | Alderson et al. |
| 2015/0104612 A1 | 4/2015 | Bianchi et al. |
| 2015/0105482 A1 | 4/2015 | Bianchi et al. |
| 2016/0039162 A1 | 2/2016 | Murphy et al. |
| 2016/0311196 A1* | 10/2016 | D'Ottaviano ........... E04C 2/243 |

FOREIGN PATENT DOCUMENTS

| | | |
|---|---|---|
| EP | 2319674 A1 | 5/2011 |
| EP | 2865505 A1 | 4/2015 |
| WO | WO-9925530 A1 | 5/1999 |

OTHER PUBLICATIONS

China National Intellectual Property Administration, First Office Action for application No. 201980050063.9, dated Jul. 29, 2021.
United States Patent and Trademark Office, Final Office Action for U.S. Appl. No. 16/427,527 mailed May 27, 2022.
USPTO, Non-Final Office Action for U.S. Appl. No. 16/427,527, mailed Dec. 21, 2021.

* cited by examiner

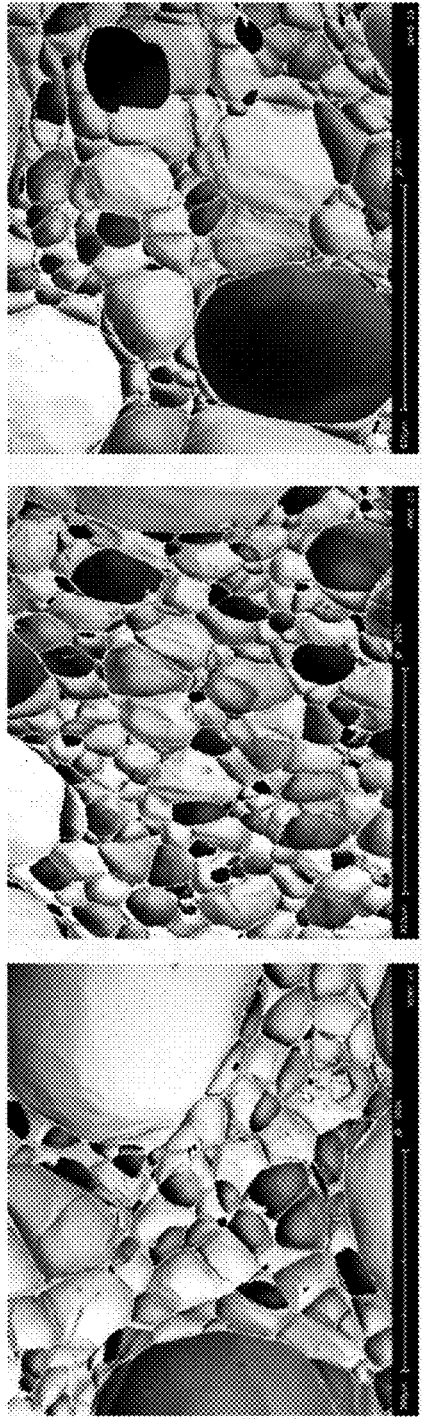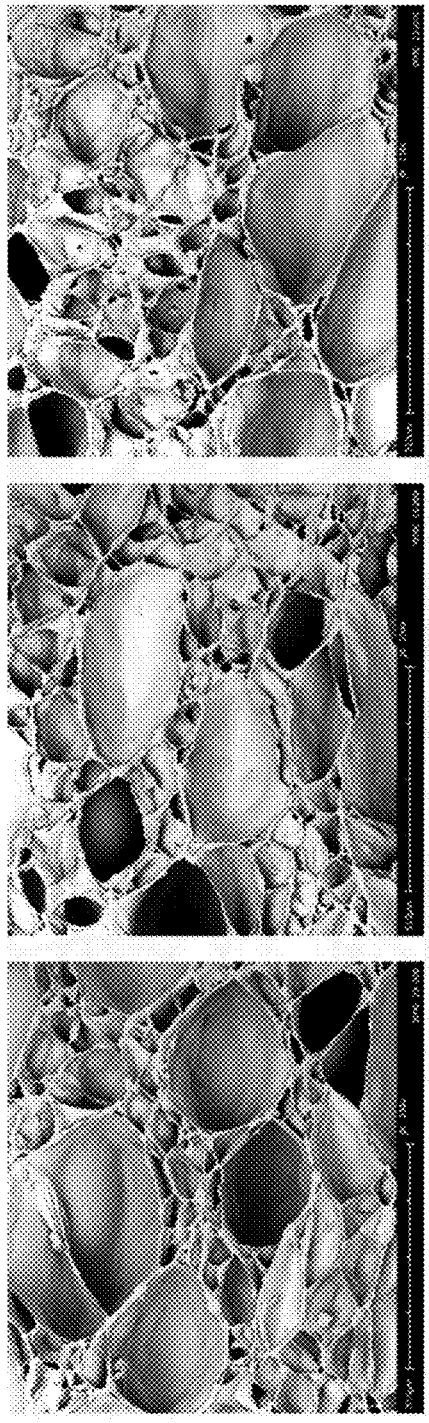
FIG. 6A — Sample 1: EVA at 0% Compression
FIG. 6B — Sample 1: EVA at 65% Compression

CUSHIONING MEMBER FOR ARTICLE OF FOOTWEAR AND RELATED METHODS

FIELD

The patent application is a continuation of U.S. application Ser. No. 16/427,527, filed on May 31, 2019, which claims priority to U.S. Provisional Application 62/678,464, filed on May 31, 2018. The disclosures of these prior applications are considered part of the disclosure of this application and are hereby incorporated by reference in their entirety.

FIELD

The present disclosure relates generally to a method of producing a cushioning material for an article of footwear.

BACKGROUND

This section provides background information related to the present disclosure and is not necessarily prior art.

Articles of footwear conventionally include an upper and a sole structure. The upper may be formed from any suitable material(s) to receive, secure, and support a foot on the sole structure. A bottom portion of the upper, proximate to a bottom surface of the foot, attaches to the sole structure. Sole structures generally include a layered arrangement extending between an outsole providing abrasion-resistance and traction with a ground surface and a midsole disposed between the outsole and the upper for providing cushioning for the foot. Cushioning components, such as insoles and sockliners, may be disposed within the upper to provide additional support to the foot of the wearer. One or more of the components of the sole structure may be formed of a foam material to provide properties of cushioning, support, and responsiveness to the sole structure.

Foam materials are a critical component of footwear due to their soft, compressible nature, and light weight. These properties provide protection and support for the foot without encumbering natural motion. Typically, softer foams provide increased comfort, but diminished durability. Poor durability manifests in deformation and densification (e.g. "packing out") of the foam over repeated use, thereby undermining the initial advantage to comfort. Conventional practice in industry, particularly for sockliners, is to sacrifice a degree of comfort for durability, and employ high density or high stiffness sockliners, that can survive repeated cyclic loadings (e.g., wear and tear of everyday use equivalent to several hundreds of miles worth of footsteps, walking or running).

Creating a foam material with desirable under foot feel requires tuning of the mechanical response of the foam during compression. Force vs. deflection in compression is a valuable way to quantify the behavior of the foam as it is loaded during a compression event akin to a foot strike during use. Force vs. deflection during compression may be evaluated by cyclic dynamic testing to provide accurate insight into the performance of the material by approximating actual use in a footwear application. Typically, foam samples of 0.5 cm, 1 cm, or 2 cm in thickness are compressed with a cylindrical tup, plunger, or indenter. For example, using a cylindrical indenter tup of 45 mm diameter, samples may compressed from 5N to 300N and back to 5N in 180 milliseconds, followed by a pause of 400 milliseconds for a frequency of approximately 1.7 Hz, mimicking the impact and cadence of running. The 300N force magnitude applied by the tup provides an analogous pressure to a body weight load applied by a larger area of the foot, often approximated by 1.2-2.0 kN. The deflection of the tup into the foam and the resistive force of the compressed foam are recorded for the entirety of each cycle. As shown in FIG. 7, the force vs. deflection test is plotted as a force-displacement curve representing the percent of compression of the material across the range of applied forces.

Multiple metrics are used to evaluate foam performance. The stiffness of the material at any point on the force-displacement curve can be calculated by measuring the slope of the curve at that point. Energy input is taken as the integral of the force-displacement curve during loading. Energy output is taken as the integral of the force-displacement curve during unloading. Efficiency is taken as the ratio of energy output to energy input. Durability or resistance to fatigue (e.g. packing out under repeated compression load/unload events) is judged by changes in any of these metrics over the course of multiple (thousands to 100s of thousands) repeated cycles.

In FIGS. 8A and 8B, conventional cushioning foams in 1 cm slabs were evaluated. These foams are common to sockliners and exhibit subtle differences in behavior. The three grades had different densities (in units of g/cc) and durometers (in units of Asker C). As illustrated in FIG. 8A, the response to compressive forces of traditional cushioning foams occurs in three stages: (1) linear elasticity; (2) plateau; and (3) densification. In the linear elasticity region, the structural integrity of the foam cell walls is maintained, where the cell walls act as trusses and support the applied load via elastic bending. In the linear elasticity region of the curve, compression is resisted by increasing force in a linear fashion. At a critical point, the cell walls buckle and offer minimal resistance to deformation, making large compressions possible with minimal increase in force, as shown in the plateau regions of the curves shown in FIGS. 8A and 8B. Finally, the collapsed cells eventually impinge on one another and the material densifies, signaled by a spike in the force shown in the densification region.

This three-stage response creates two problems for footwear applications. First, the initial stiffness of the foam shifts the response curve toward larger forces during compression. Even in the plateau region, where the stiffness is relatively low, the force required for additional compression is non-negligible. This results in the foam being perceived by the wearer as being stiffer and less comfortable. The initially stiff region specifically may be described as feeling like an uncomfortable "crust" that must be overcome before cushioning properties can be realized by the wearer. Additionally, in use, the cushioning foams are often subjected to repeat cycling through the cell collapse stage. Cell wall buckling results in local stresses, which cause finite amounts of plastic deformation with each buckling event. The result is that with repeated cycles, the foam response curve begins to drift as the cell walls break down, and the foam is permanently deformed. Thus, while suitable for its intended purpose, there exists a need for a foam material offering improved comfort and durability.

DESCRIPTION OF THE DRAWINGS

The drawings described herein are for illustrative purposes only of selected embodiments and not all possible implementations, and are not intended to limit the scope of the present disclosure.

FIGS. 6A and 6B shows micrographs demonstrating the effects of compression on a closed-cell foam material;

DETAILED DESCRIPTION

Figure 1:
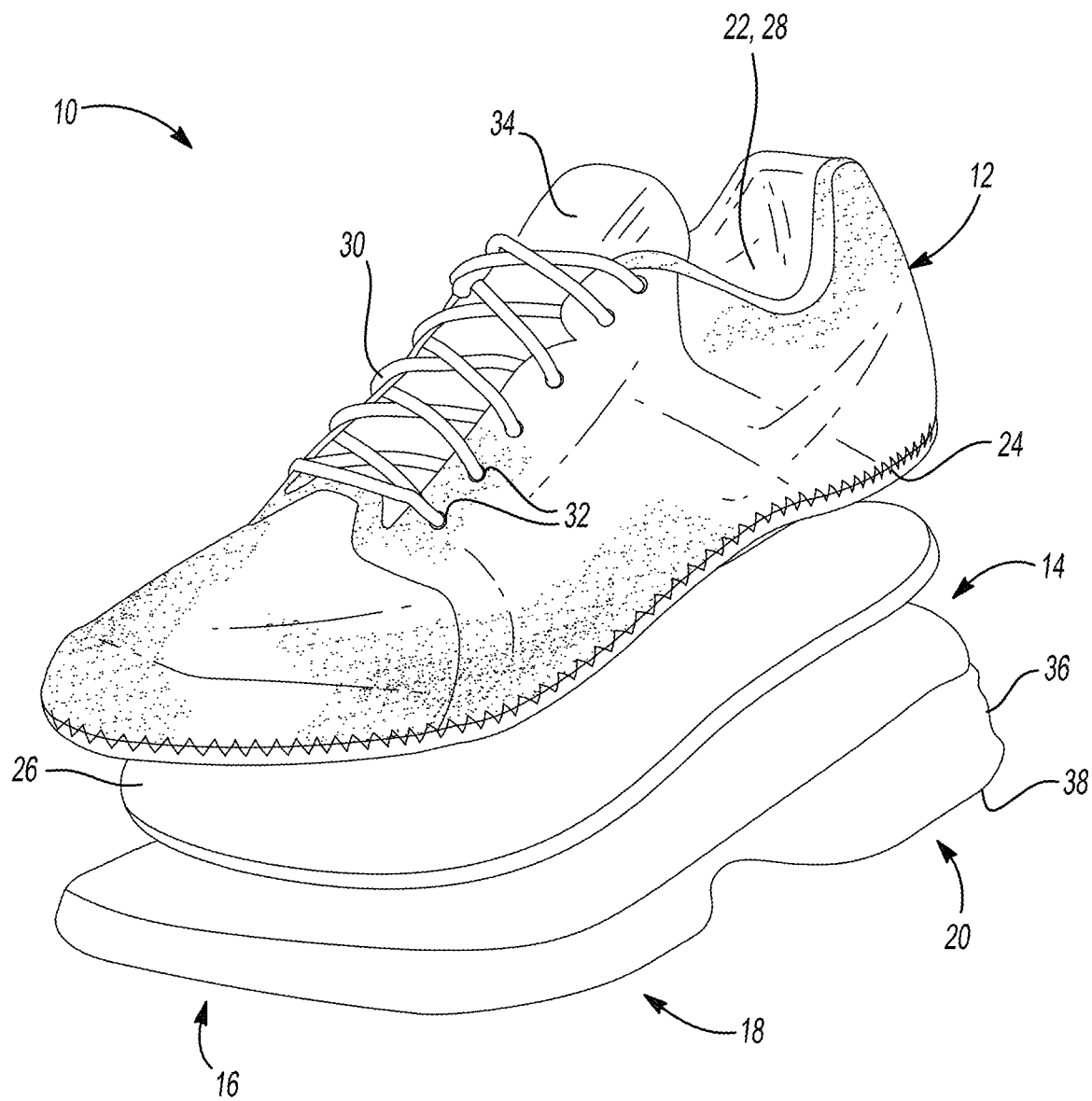
FIG. 1 is an exploded perspective view of an article of footwear incorporating a sole structure in accordance with the principles of the present disclosure.

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of included features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or sheet is referred to as being "on," "engaged to," "connected to," or "coupled to" another element or sheet, it may be directly on, engaged, connected or coupled to the other element or sheet, or intervening elements or sheets may be present. In contrast, when an element is referred to as being "directly on," "directly engaged to," "directly connected to," or "directly coupled to" another element or sheet, there may be no intervening elements or sheets present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, sheets and/or sections, these elements, components, regions, sheets and/or sections should not be limited by these terms. These terms may be only used to distinguish one element, component, region, sheet or section from another region, sheet or section. Terms such as "first," "second," and other numerical terms when used herein do not imply a sequence or order unless clearly indicated by the context. Thus, a first element, component, region, sheet or section discussed below could be termed a second element, component, region, sheet or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A method of forming a polymeric foam material is provided and includes (i) providing a precursor material having a first thickness, the precursor material being an open-cell foam material and (ii) applying a uniaxial compressive force to the precursor material to compress the precursor material to a second thickness, the compressive force causing a cell structure of the precursor material to collapse. The method also includes (iii) heating the precursor material at a molding temperature for a first time period while the compressive force is applied, the first time period being sufficient to heat the precursor material to a core temperature exceeding a softening temperature, akin to a melting point or glass transition point, which can be identified via differential scanning calorimetry and should be in the range of 80-130° C., preferably in the range of 90-120° C. or 100-115° C., (iv) removing the compressive force from the precursor material, and (v) maintaining the cell structure of the precursor material in a collapsed state.

In one configuration, a ratio of the first thickness to the second thickness may be at least 1.5:1, the second thickness may range from 3 mm to 25 mm, or other intermediate thicknesses. The molding temperature may range from 120° C. to 400° C., the first time period may range from 120 seconds to 1100 seconds, and/or the precursor material may be a low-density open-cell polyurethane.

The method may additionally include cooling the precursor material at a cooling temperature for a second time period while the compressive force is applied, the cooling temperature being less than the softening temperature. In one configuration, the cooling temperature ranges from 0° C. to 10° C.

The first time period may be sufficient to heat the precursor material above a softening temperature of the precursor material, allowing molecular motion that flows into and adopts the collapsed state without being 'broken', and the second time period may be sufficient to cool the precursor material below the softening temperature, thereby freezing-in or kinetically trapping the foam in that new collapsed morphology. This serves to promote the inventive principle, breaking the trade-off between stiffness and durability, by changing the microstructural morphology of the foam.

In one configuration, the compressive force may be a pressure of approximately 30 kilograms per square centimeter.

A method of forming a cushioning member for an article of footwear is provided and includes (i) providing precursor material having a first thickness, the precursor material being an open-cell foam material and (ii) applying a uniaxial compressive force to the precursor material to compress the precursor material to a second thickness, the compressive force causing cell structures of the precursor material to move to a collapsed state. The method additionally includes (iii) heating the precursor material to a first temperature above a softening temperature of the precursor material while maintaining the cell structures in the collapsed state and (iv) cooling the precursor material to a second temperature below the softening temperature of the precursor material while maintaining the cell structures in the collapsed state.

In one configuration, a ratio of the first thickness to the second thickness may be at least 1.5:1, the second thickness may range from 4 mm to 6 mm, the precursor material may be heated at a molding temperature ranging from 130° C. to 400° C., and more particularly from 140° C. to 200° C., and more particularly from 145° C. to 185° C. The precursor material may be heated for a time period ranging from 120 seconds to 1100 seconds, the precursor material may be a low-density, open-cell polyurethane, the precursor may be cooled at a cooling temperature ranging from 0° C. to 10° C., and/or the compressive force may be a pressure of 30 kilograms per square centimeter.

The method may additionally include shaping the precursor material into the shape of one of a sockliner, an insole, a midsole, a cushioning insert, and an outsole. Further, the cushioning member may be incorporated into an article of footwear.

Referring to FIG. 1, an article of footwear 10 includes an upper 12 and sole structure 14. The article of footwear 10 may be divided into one or more regions. The regions may include a forefoot region 16, a mid-foot region 18, and a heel region 20. The upper 12 includes interior surfaces that define an interior void 22 configured to receive and secure a foot for support on sole structure 14. The upper 12 may be formed from one or more materials that are stitched or adhesively bonded together to form the interior void 22. Suitable materials of the upper may include, but are not limited to, mesh, textiles, foam, leather, and synthetic leather. The materials may be selected and located to impart properties of durability, air-permeability, wear-resistance, flexibility, and comfort.

In some examples, the upper 12 includes a strobel 24 having a bottom surface opposing the sole structure 14 and an opposing top surface defining a footbed of the interior void 22. Stitching or adhesives may secure the strobel 24 to the upper 12. The footbed may be contoured to conform to a profile of the bottom surface (e.g., plantar) of the foot. Optionally, the upper 12 may also incorporate additional layers such as an insole 26 or sockliner that may be disposed upon the strobel 24 and reside within the interior void 22 of the upper 12 to receive a plantar surface of the foot to enhance the comfort of the article of footwear 10.

An ankle opening 28 in the heel region 20 may provide access to the interior void 22. For example, the ankle opening 28 may receive a foot to secure the foot within the void 22 and facilitate entry and removal of the foot from and to the interior void 22. In some examples, one or more fasteners 30 extend along the upper 12 to adjust a fit of the interior void 22 around the foot and to accommodate entry and removal of the foot therefrom. The upper 12 may include apertures 32 such as eyelets and/or other engagement features such as fabric or mesh loops that receive the fasteners 30. The fasteners 30 may include laces, straps, cords, hook-and-loop, or any other suitable type of fastener. The upper 12 may include a tongue portion 34 that extends between the interior void 22 and the fasteners 30.

The sole structure 14 is attached to the strobel 24 of the upper 12, and includes one or more components 36, 38 for providing an interface between the foot and the ground surface. For example, the sole structure 14 may include a midsole 36 and an outsole 38. The midsole 36 is configured to provide characteristics of cushioning and stability to the footwear, and may include foams, composites, fluid-filled bladders, mechanical dampeners, or combinations thereof. The outsole 38 is configured to provide a ground-engaging interface of the sole structure 14, and may be formed of a material imparting characteristics of durability and grip. In some examples, the sole structure may include traction elements, such as cleats or studs for engaging soft ground surfaces.

With reference to FIGS. 2-4B, a method 200 for forming a foam cushioning member 300 for the article of footwear 10 is provided. In the illustrated example, the method 200 is shown with respect to forming the cushioning member 300 as the insole 26 of the footwear 10. However, the method may similarly be applied to the manufacture of foam midsoles, outsoles, inserts or other cushioning members of the footwear 10.

In a first step 210 of the method 200, a suitable precursor material 302 is selected. During testing, it was discovered that open-cell foams exhibit properties favorable to forming cushioning members according to the instant disclosure. Particularly, polyurethane foams having an open cell structure are favorable in that the walls of each of the cells are able to collapse or buckle when subjected to a compressive force. Such foam materials exhibit more favorable cushioning characteristics once the structural integrity of the cell walls is compromised.

In contrast to collapsible open-cell foams, closed-cell foams demonstrated less favorable cushioning characteristics when subjected to compressive forces. Specifically, cell walls in closed-cell foams do not collapse when subjected to compression, but merely densify to form a compressed cell structure. During compression of closed cell foams, the cell structures remain in a similar morphology despite the densification. For example, FIGS. 6A and 6B show micrographs of cell structures of a closed-cell foam (e.g., ethylene-vinyl acetate) in a relaxed state (i.e. 0% compression) and in a compressed state (i.e. 65% compression). As shown, the cells in the compressed-state, closed-cell foam are more densely packed, but do not have collapsed walls. Accordingly, force-deflection curves for closed-cell foams do not include a "plateau" region, as discussed above with respect to open-cell foams.

In addition to selecting a foam having an open cell structure, suitable materials for the method 200 are capable of being thermoformed at 50% compression, whereby a conversion ratio of the material is greater than 80% and, more preferably, greater than 90%. For the sake of this disclosure, the conversion ratio is defined as the ratio of a compressed height of the material imposed during a thermoforming step versus a final height of the material 24 hours after thermoforming. For example, a precursor material having a 12 mm thickness may be compressed to a collapsed state at a height of 6 mm during thermoforming, and then allowed to cool in the collapsed state before removing the compression. Suitable precursor materials would sustain a thickness of less than 7.5 mm (i.e., 6.0 mm/7.5 mm=80%) 24 hours after thermoforming and, more preferably, would sustain a thickness of less than 6.67 mm (i.e., 6 mm/6.67 mm=90%). Materials having high conversion rates are advantageous for use in the method 200 described herein, as it is desirable to maintain the precursor material in the collapsed state after thermoforming, as described in greater detail below.

Additionally, various physical properties of the precursor material have been discovered to affect the cushioning and durability properties of cushioning members 300 formed using the method 200. Table 1, below, provides a listing of physical properties discovered to be favorable to formation of cushioning members 300 according to the instant disclosure. Table 2 provides a listing of physical properties of materials that were tested and performed suitably.

TABLE 1

Precursor Material Physical Properties

| Property | Value |
| --- | --- |
| Durometer (Shore 000) | 63.00-80.00 |
| Elongation (%) | ≥50.00 |
| Tensile Strength (kg/cm$^2$) | ≥3.00 |
| Tear Strength (kg/cm) | ≥0.90 |
| Split Tear Strength (kg/cm) | ≥0.15 |
| Specific Gravity | 0.05-0.09 |
| Compression Set (%) | ≤20 |
| Resilience (%) | ≥20 |

TABLE 2

Precursor Examples

| | Material | | | |
| --- | --- | --- | --- | --- |
| Property | A | B | C | D |
| Hardness (Shore000) | 74 | 67 | 75 | 65 |
| Elongation (%) | 101 | 96.7 | 85.96 | 80 |
| Tensile Strength (kg/cm$^2$) | 4.65 | 3.48 | 3.19 | 3.56 |
| Tear Strength (kg/cm) | 1.50 | 1.10 | 1.01 | 1.09 |
| Split Tear Strength (kg/cm) | 0.3 | 0.2 | 0.19 | 0.21 |
| Specific Gravity | 0.07 | 0.072 | 0.077 | 0.08 |
| Compression Set (%) | 10.5 | 13 | 10.5 | 10.2 |
| Resilience (%) | 33.5 | 35 | 44 | 29 |

In some examples, the precursor material is provided as a slab or sheet stock, wherein the entire precursor is homogenously and continuously formed of the precursor material. However, in some examples, precursor foam scrap sheets and pieces can be cut or shredded into pieces (sized millimeter to centimeter sized pieces) that can be recombined to form a shredded composite foam precursor material. In some examples, up to 20% ground EVA foam or polyurethane foam scrap recycled content can also be mixed in and included into the composite foam formulation.

To form the composite precursor material, the foam pieces are bonded by heating the pieces above the softening temperature (at about ~120-170° C.) and lightly compacting the pieces into sheets or blocks. Here, the pieces may be compressed by approximately 10% to 50%, which is sufficient compression to facilitate bonding, but does not reach the threshold compression for initiating microstructural changes to the foam that elicit different properties described in more detail below. When forming the shredded composite precursor, adhesion between the pieces can be improved by adding small amounts of spray-on adhesive or hotmelt (<1% wt). Additionally or alternatively, various amounts of polyol and isocyanate (polyurethane precursors) can be added at this stage to bind or adhere the pieces.

The shredded composite precursor can then be calendared and coated on one or both sides with a laminated hotmelt film or topcloth as desired to help provide further integrity to the shredded composite precursor. Additionally or alternatively, the composite sheets or foam blocks can be skived to thinner thicknesses and then calendared, coated, etc.

Figure 3:
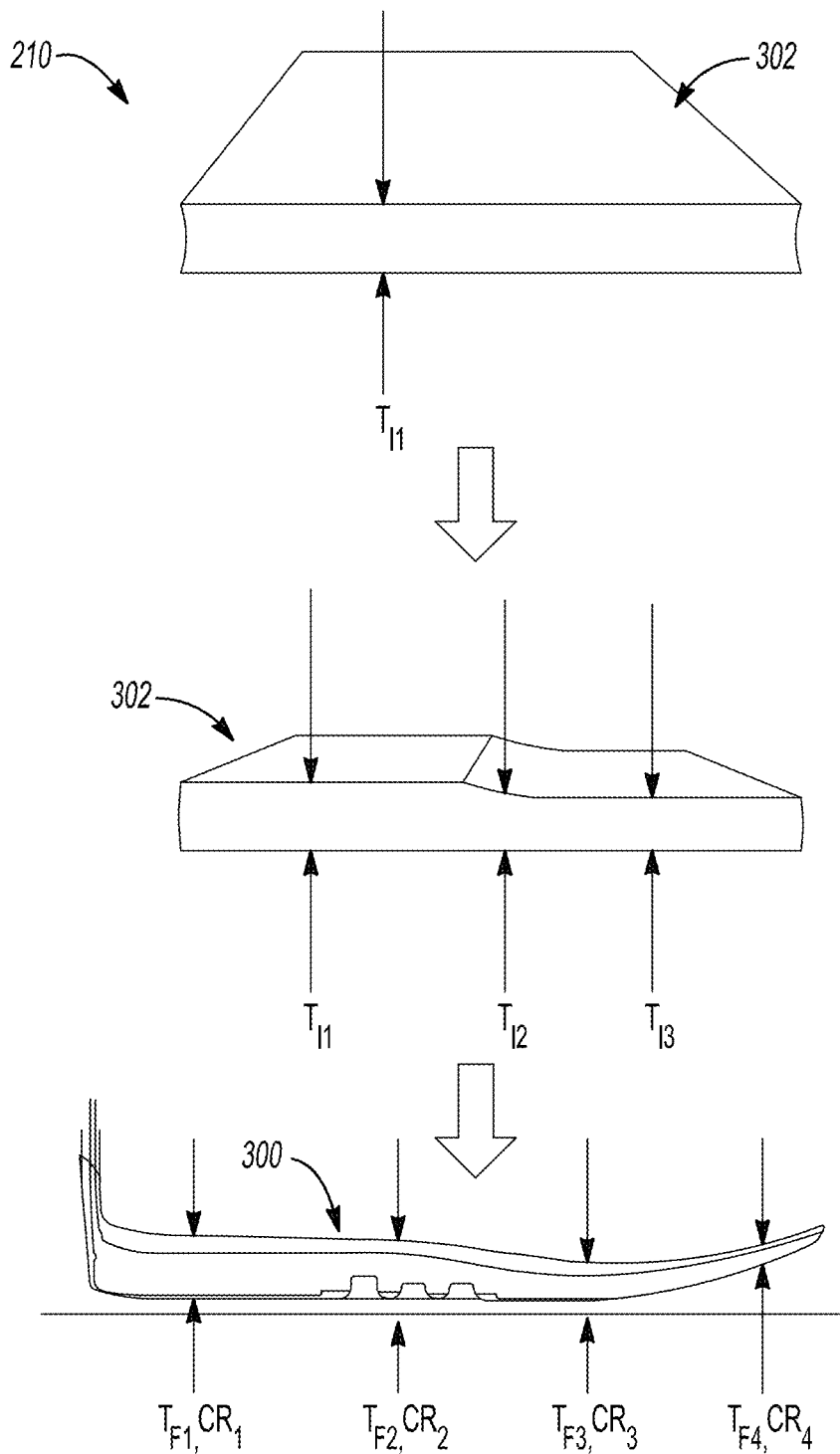
FIG. 3 is a schematic diagram showing an example of a cushioning member produced in accordance with the method of FIG. 2.

An initial thickness $T_I$ of the precursor material 302 is selected based on a desired finished thickness $T_F$ and compression ratio CR of the cushioning member 300. The compression ratio CR is the ratio of the initial thickness $T_I$ to the finished thickness $T_F$, and may range from 1.5:1 to 4:1, depending on the desired performance characteristics of the cushioning member. Accordingly, an initial thickness $T_I$ will be selected to account for compression of the precursor foam during the molding process 240. In some examples, the initial thickness $T_I$ of the precursor may be constant, whereby the entire precursor 302 has the same initial thickness $T_I$. A precursor 302 having a constant initial thickness $T_I$ may be used where the finished thickness $T_F$ of the cushioning member 300 is also substantially constant, such as in sockliners or insoles. In some examples, the initial thickness $T_I$ of the precursor material 302 may be variable to account for varied thicknesses of the cushioning member 300. For example, where the cushioning member 300 is a midsole, the finished thickness $T_F$ may be greater in the heel region 20 than in the forefoot region 16. Accordingly, the initial thickness $T_I$ of the precursor 302 may be contoured prior to molding to provide a variable initial thickness $T_{I1-3}$, as shown in FIG. 3. Alternatively, a precursor 302 having a constant initial thickness $T_I$ may be used in applications having a variable finished thickness $T_F$, where a compression ratio CR applied to the precursor during the molding step 240 is variable. For example, the forefoot region 16 may be subjected to a compression ratio of 3.5:1 and the heel region 20 may be subjected to a compression ratio of 2.3:1. In some examples, a precursor 302 having a variable initial thickness $T_{I1-3}$ may be used in combination with a variable compression ratio $CR_{1-4}$ to form a cushioning member 300 having a variable finished thickness $T_{F1-4}$, as shown in FIG. 3.

Once properties (e.g., material type, structure, thickness) for the precursor 302 are selected, the precursor 302 may be subjected to an optional lamination step 220, whereby a top cloth 304 is layered upon an upper surface of the precursor 302, which ultimately serves as the footbed of the cushioning member 300 when used in conjunction with the footwear 10. The top cloth 304 may be formed of one or more types of fabrics with desirable properties of breathability, resistance to shrinkage, abrasion resistance, color fastness, adhesion, and durability, for example. The top cloth 304 is attached to the upper surface of the precursor 302 using a hotmelt adhesive film, waterborne or solventborne adhesive, or cement, which is applied as a coating on the upper surface of the precursor at a thickness of approximately 0.15 mm. As shown at step 220 in FIG. 2, the top cloth 304 may be applied using a compression rolling process, whereby the stacked precursor 302 and top cloth 304 are subjected to pressure applied via rollers to secure the top cloth 304 to the upper surface of the precursor 302. In some examples, the top cloth 304 may be applied to the precursor 302 after the molding step 240. However, if the top cloth 304 is applied after the molding step 240, application and curing temperatures greater than a softening temperature $t_G$ of the precursor material may not be used, as this may result in relaxation of the pre-collapsed cell structure of the cushioning member 300.

The precursor 302 and the top cloth 304 may be provided and laminated in bulk form as a sheet, block, or roll of material. Accordingly, prior to the molding step 240 described below, the precursor 302 and top cloth 304 may be cut into molding blanks 306 having a size suitable for insertion into cavities of the molds. In some examples, the precursor 302 and top cloth 304 may be provided at molding size prior to the lamination step 220. In other examples, the molding system may be configured to receive the precursor 302 and top cloth 304 in the bulk form, whereby no cutting is necessary.

Figure 4A:
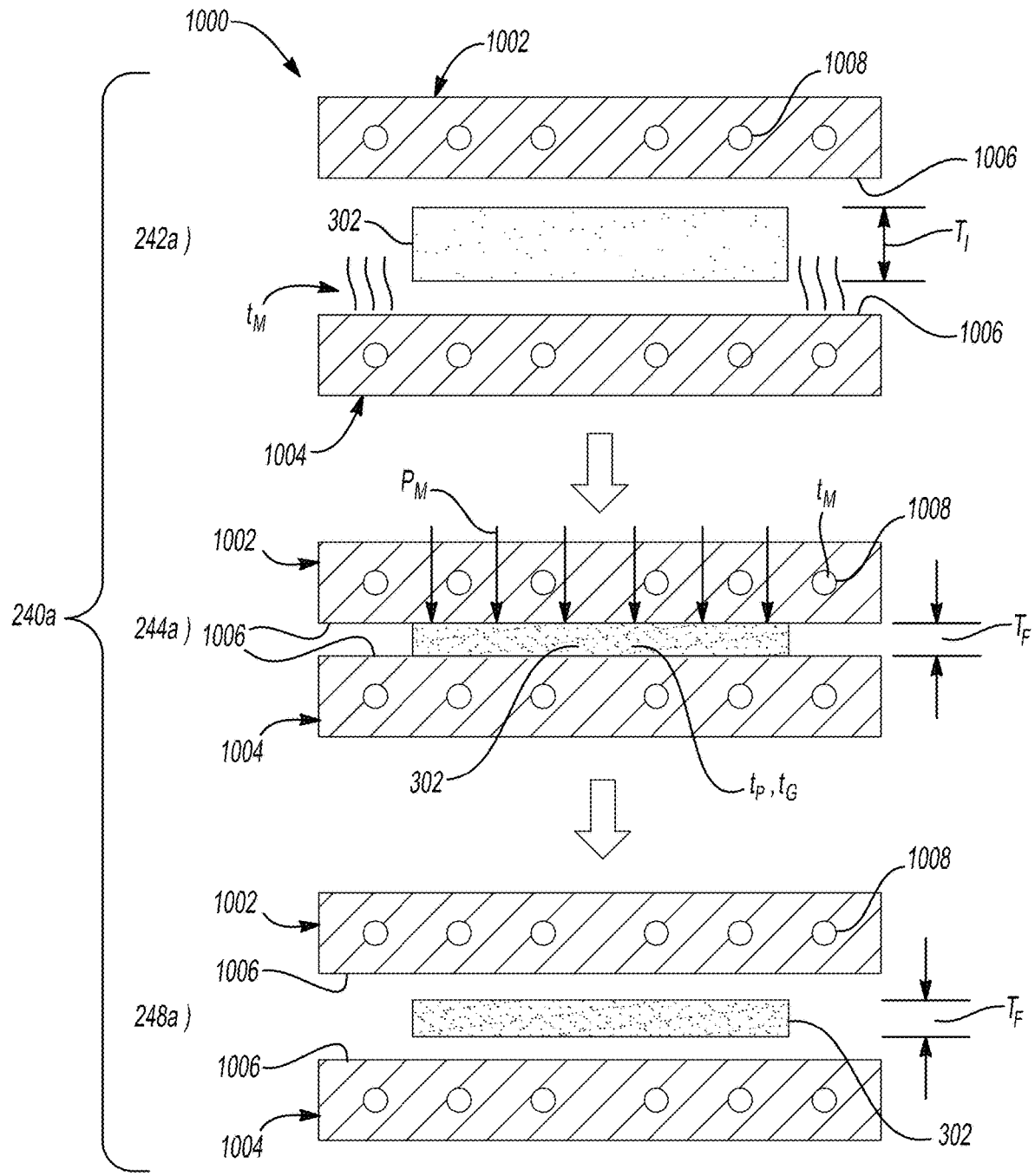
FIG. 4A is a schematic diagram showing an example of a molding process in accordance with the principles of the present disclosure.
Figure 4B:
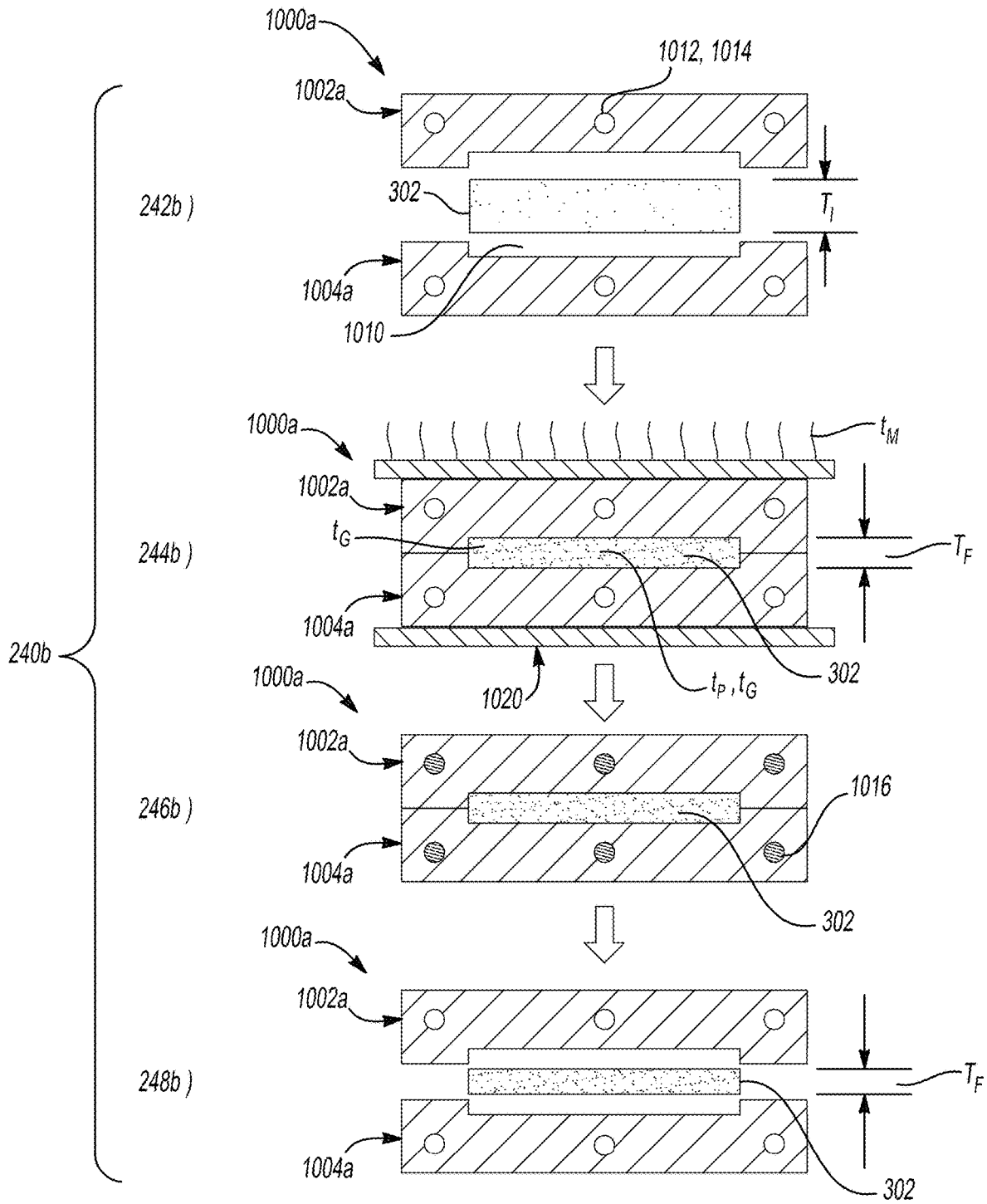
FIG. 4B is a schematic diagram showing another example of a molding process in accordance with the principles of the present disclosure.
Figure 5:
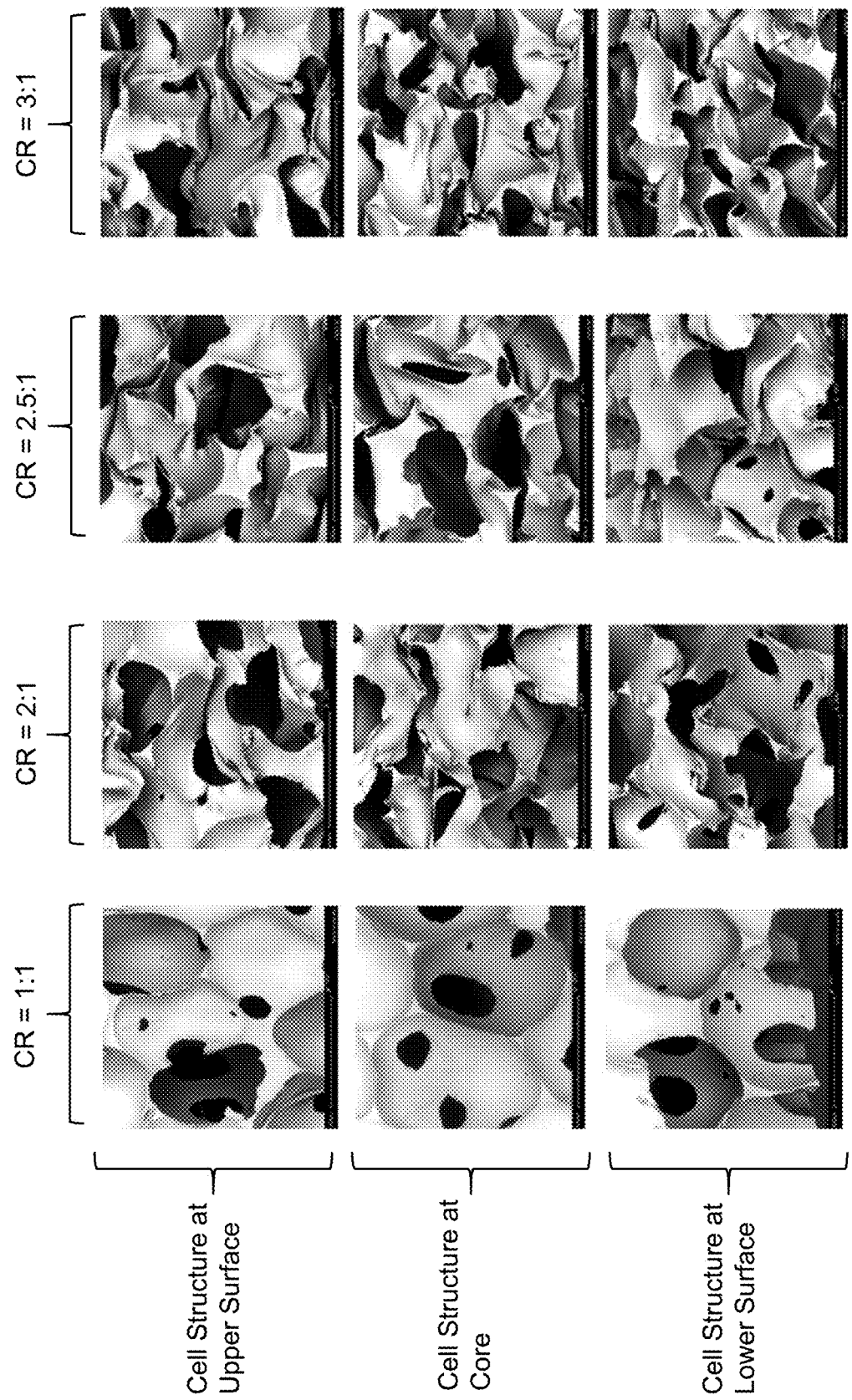
FIG. 5 shows micrographs of an example of cell structure of a precursor material before and after application of the method of FIG. 2.
Figure 7:
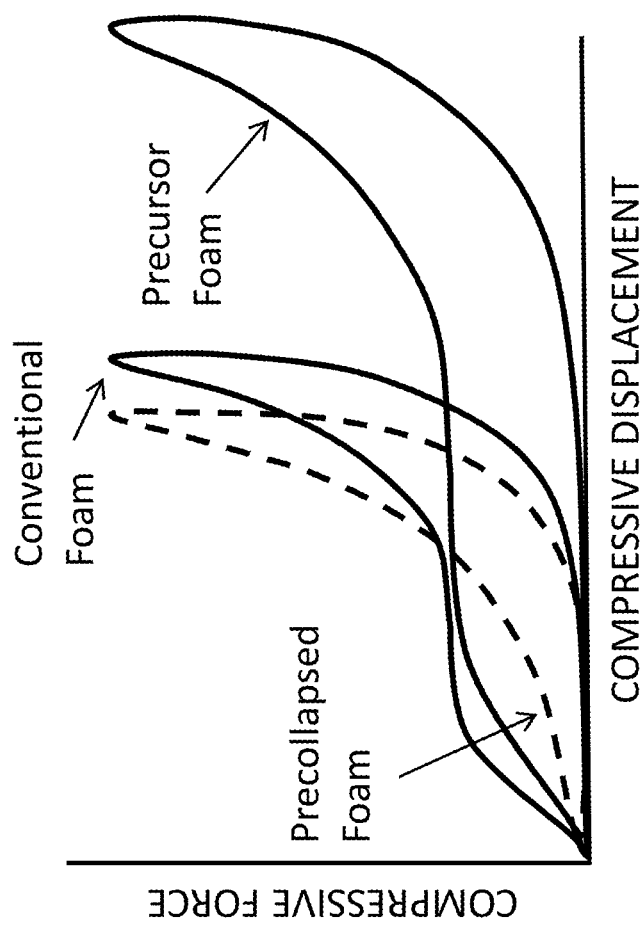
FIG. 7 is an example of a force-displacement graph showing force-displacement curves for a precursor material, a conventional foam material, and a pre-collapsed foam material formed in accordance with the principles of the present disclosure.

Once prepared, the precursor 302 is processed in a molding step 240 that subjects the precursor 302 to a combination of heat, compression, and cooling to transition the cell structure of the precursor 302 from a relaxed state to a homogenously collapsed state, as shown in FIG. 5. Two different molding processes 240 have been found to provide favorable results: (1) an open-mold, heat press process 240a, as illustrated in FIG. 4A; and (2) an enclosed Phylon molding process 240b, as shown in FIG. 4B.

With reference to FIG. 4A, the heat press process 240a is illustrated. In the heat press process 240a, a molding system 1000 is provided including an upper mold 1002 and a lower mold 1004. The upper mold 1002 and the lower mold 1004 may be described as being platens 1002, 1004 having mold surfaces 1006. Each of the upper mold 1002 and the lower mold 1004 are directly heated by a heat source, such as a heating coil 1008, such that the mold surfaces 1006 are actively heated. The mold surfaces 1006 may be planar, or may have a contoured profile corresponding to a desired profile of the finished cushioning member 300. As shown, the molding system 1000 is an open-air molding system 1000, whereby the upper and lower molds 1002, 1004 do not form an enclosed cavity for molding the precursor 302, but instead only apply pressure uniaxially by mold surfaces 1006 while the sides of the precursor 302 remain exposed to the environment. Accordingly, heat may dissipate from the precursor 302 at a greater rate than in an enclosed mold.

In a first step 242a of the heat press process 240a, the precursor 302 is loaded into the mold system 1000 in an uncompressed state with the precursor 302 having an initial thickness As shown in FIG. 5, in the uncompressed state (CR=1:1), the cell structure of the precursor 302 is uncollapsed throughout a thickness $T_I$ of the precursor 302 such that the structural integrity of the cell walls is maintained.

The upper mold 1002 and the lower mold 1004 are heated to a molding temperature $t_M$ above a softening temperature $t_G$ of the precursor material 302. Maintaining the molding temperature $t_M$ within a desired range is critical to uniform formation and retention of the collapsed cell structure. For example, the molding temperature $t_M$ must be high enough to ensure that the entire precursor 302 can be heated above the softening temperature $t_G$ of the material, but low enough to minimize "skinning" of the precursor 302. If the molding temperature $t_M$ this too low, the cell structure of the precursor 302 will not soften and re-flow to allow the collapsed cells to reshape in the collapsed state. Accordingly, the precursor 302 will rebound and return to the uncollapsed state when mold pressure is removed. On the other hand, if the molding temperature $t_M$ this too high, it will cause areas of the precursor 302 adjacent to the mold surfaces 1006 to be heated significantly above the softening temperature $t_G$ before the softening temperature $t_G$ is able to saturate the entire precursor 302. Particularly, heating of the exposed outer periphery of the precursor 302 may lag behind heating of the upper and lower surfaces of the precursor 302 due to exposure of the outer periphery of the precursor 302 to the relatively cool external atmosphere. Consequently, a dense "skin" layer may form in the precursor 302 adjacent to the mold surfaces 1006. Although a thin skin layer may be suitable, or even desirable in some cases, excessive skin may adversely affect cushioning characteristics of the cushioning member, as skin is typically associated with increased cell density and stiffness, and minimizes the effective cushioning thickness of the cushioning member 300. In tests using Material A from Table 2, above, a molding temperature $t_M$ range from 180° C. to 185° C. was found to provide favorable results, whereby the molded precursor 302 retained its collapsed shape and had minimal skin formation.

Referring still to FIG. 4A, at a molding step 244a of the heat press process 240a, the upper mold 1002 and the lower mold 1004 are moved towards each other to subject the precursor 302 to a uniaxial mold pressure $P_M$. The mold pressure $P_M$ is set to provide a desired compression ratio CR and/or finished thickness $T_F$ of the cushioning member 300. As discussed herein, the compression ratio CR may be selected based on desired performance characteristics of the cushioning member 300. However, a compression ratio CR of at least 1.5:1 has been found to ensure uniform collapse of the cell structure throughout the entire thickness of the precursor 302. In one example, where an initial thickness $T_I$ of the precursor 302 was 12 mm and the finished thickness $T_F$ was 5.5 mm, a pressure of 30 kg/cm² was found to be sufficient to collapse the entire cell structure. FIG. 5 shows micrographs of Material A after subjection to compression ratios CR of 2:1, 2.5:1, and 3:1. As shown, the cell structures of each example are uniformly compressed and collapsed at each of a top surface, a core, and a bottom surface, such that the precursor 302 has a uniformly collapsed cell structure throughout the finished thickness $T_F$.

The precursor 302 is subjected to the mold pressure $P_M$ and the molding temperature $t_M$ for a period of time sufficient to allow the molding temperature to raise the core temperature $t_P$ of the precursor above a softening temperature $t_G$ of the precursor material. As discussed above, the recipe for mold time and molding temperature requires a balance to ensure the entire precursor 302 is saturated with a temperature greater than the softening temperature $t_G$ while minimizing overheating (i.e. skinning) of the exterior surfaces. In examples using Material A, a mold time of 120 seconds at a molding temperature $t_M$ of 180° C. to 185° C. was sufficient to raise and hold the core temperature $t_P$ of the precursor 302 to a temperature of 180° C. for a period of at least thirty (30) seconds. The thirty second dwell time within the mold system 1000 ensured that the molding temperature $t_M$ saturated the precursor 302, and allowed all cells to adopt the collapsed structure imparted by the uniaxial mold pressure $P_M$. In some examples, a longer dwell time, such as a sixty (60) second dwell time, may be used.

After the application of heat and pressure, the precursor 302 is allowed to cool to a core temperature $t_P$ below the softening temperature $t_G$ prior to removing the mold pressure $P_M$. Accordingly, the precursor 302 hardens and the collapsed cell structure imparted by the heat and pressure is retained. Because the mold system 1000 is an open-air mold system, as described above, the periphery of the precursor 302 is exposed to the surrounding environment (i.e., ambient air) and the precursor 302 can be allowed to passively cool while in the compressed state. Alternatively, the precursor 302 may be actively cooled by providing a cooling fluid to the precursor 302 or to one or more of the molds 1002, 1004.

Referring still to FIG. 4A, at step 248a the precursor 302 is removed from the mold system 1000 once the precursor 302 is cooled below the softening temperature $t_G$. Here, the cell structure of the precursor 302 is retained in the collapsed state, as shown in the examples of FIG. 5, and the precursor 302 can proceed to various finishing steps 250, 260, 270, as discussed in greater detail below.

With reference to FIG. 4B, an alternative example of a suitable molding process 240b for the method 200 of the instant disclosure is provided. In contrast to the heat press process 240a discussed above with respect to FIG. 4A, the molding process 240b of FIG. 4B utilizes an enclosed molding system 1000a having an upper mold plate 1002a and a lower mold plate 1004a that cooperatively define a mold cavity 1010 for receiving and molding the precursor 302. The molding system 1000a is known commercially as a Phylon molding process. The molds 1002a, 1004a of the molding system 1000a are configured to receive the uncompressed precursor 302 within the cavity 1010, and are then placed between heated platens of a press, which applies heat and pressure to compress the molds 1002a, 1004a on the precursor 302. Thus, unlike the molding system 1000 of FIG. 4A, which applies heat and pressure directly to the precursor via the upper and lower molds 1002, 1004, heat and pressure are applied indirectly from a press to the precursor 302 through the molds 1002a, 1004a. Accordingly, as discussed below, molding times for the Phylon molding process 240b may be longer, as heat must be conducted through the molds 1002a, 1004a. Because the molds 1002a, 1004a have a relatively large mass and are configured to retain heat, the molds 1002a, 1004a may be provided with an active cooling system 1012 for cooling the molds 1002a, 1004a after the molding time has expired. For example, the molding system 1000a may include a plurality of conduits 1014 for providing a heat transfer fluid 1016 to the molds 1002a, 1004a from an external heat exchange system (not shown).

In a first step 242b of the Phylon molding process 240b, the uncompressed precursor 302 having an initial thickness $T_I$ is loaded into the portion of the cavity 1010 defined by the lower mold 1004a. The upper mold 1002a is then positioned atop the precursor 302 so that an upper portion of the precursor 302 is received within the portion of the mold cavity 1010 defined by the upper plate 1002a. In some examples, the upper and lower molds 1002a, 1004a may be closed manually prior to insertion into the press 1020. However, in cases where the precursor has a relatively high density or thickness, which prevents manual closure, the upper and lower molds 1002a, 1004a may be closed by the pressure of the press 1020.

In a molding step 244b of the Phylon molding process 240b, the molding temperature $t_M$ and dwell time will differ from the times and temperatures described above with respect to the heat press process 240a. Particularly, where the process 240a described above is an open-air process and allows for a relatively high rate of heat dissipation from the precursor 302, the enclosed molds 1002a, 1004a of the Phylon molding process 240b experience relatively low rates of heat dissipation. Accordingly, the molding temperature $t_M$ and core temperature $t_P$ used in the Phylon molding process 240b can be lower than the molding temperature $t_M$ and core temperature $t_P$ used in the heat press process 240a. For example, where a molding temperature $t_M$ of 180° C. to 185° C. and a core temperature of 180° C. are used in the heat press process 240a to ensure the entire precursor 302 is raised above a softening temperature $t_G$ (e.g., 113° C.) of Material A, the molds 1002a, 1004a in the Phylon molding process are heated to 165° C. to achieve a precursor core temperature of 140° C. The minimized heat dissipation resulting from the enclosed mold cavity 1010 allows the entire precursor 302 to be heated above the softening temperature $t_G$, despite the lower mold temperature $t_M$ and core temperature $t_P$.

Although the rate of heat dissipation is relatively low in the Phylon molding process 240b compared to the heat press process 240a, the dwell time is greater due to the increased mass of the molds 1002a, 1004a that must be heated, as well as the lower molding temperatures $t_M$. In an example of the Phylon molding process 240b applied to Material A, the molds 1002a, 1004a are heated at 165° C. for 390 seconds, which allows the core temperature $t_P$ of the precursor 302 to be heated to and held at 140° C. for a period of at least 60 seconds. The 60 second dwell time used in the Phylon molding process 240b is suitable for ensuring that all cells of the precursor 302 are given sufficient time to reshape in the collapsed state. In some examples, the molding time may substantially greater than 390 seconds (e.g. 1100 seconds) depending on the material type, finished thickness $T_F$, and/or density of the precursor 302.

The Phylon molding process 240b further differs from the heat press process 240a in that it includes an active cooling step 246b for lowering the temperature of the precursor 302 below the softening temperature $t_G$. As shown in FIG. 4B, at step 246b the cooling fluid 1016 is circulated through the conduits 1014 to cool the molds 1002a, 1004a. In an example of the Phylon molding process 240b applied to Material A, the molds 1002a, 1004a are cooled at 10° C. for 390 seconds, which allows the core temperature $t_P$ of the precursor 302 to be cooled to and held at 30° C. for a period of at least 60 seconds. In other examples, the molds 1002a, 1004a may be cooled at a temperature ranging from 0° C. to 10° C., depending on the material type, thickness, and density of the precursor 302.

As with the heat press process 240a, the precursor 302 is removed from the mold system 1000a once the entire precursor 302 is cooled below the softening temperature $t_G$, as shown at step 248b. Here, the cell structure of the precursor 302 is retained in the collapsed state, as shown in the examples of FIG. 4B. At this point, the precursor 302 can proceed to the various finishing steps 250, 260, 270, as discussed in greater detail below.

Because of the propensity of the molds 1002a, 1004a to sustain a more uniform temperature gradient throughout the precursor 302, and the ability to apply a greater compression force to the molds 1002a, 1004a than in the heat press process 240a, the Phylon molding process 240b is favorable for forming cushioning members having a greater finished thicknesses $T_F$ and compression ratios CR than the heat press process 240a. For example, the heat press process 240a may be utilized on cushioning members 300 having finished thicknesses $T_F$ up to 7 mm, such as insoles and sockliners, while the Phylon molding process 240b can be used for cushioning members having a finished thicknesses $T_F$ up to and greater than 6 mm.

While the examples above are provided with respect to a precursor formed of Material A and having an initial thickness $T_I$ of 12 mm and finished thickness $T_F$ ranging from 4 mm to 6 mm, molding temperatures $t_M$ and times will vary depending on the material type, compression ratio CR, and finished thickness $T_F$. Nevertheless, the general molding recipe will remain the same regardless of the molding process 240, material type, compression ratio CR, or finished thickness $T_F$, and includes the steps of: (1) applying uniaxial compression along a thickness of the precursor to uniformly collapse the cell structure throughout the entire thickness; (2) heating the precursor above a material softening temperature $t_G$ for a predetermined period of time to allow all cells to reshape in the collapsed state; (3) cooling the precursor below the material softening temperature $t_G$ for a predetermined period of time while subjected to pressure to allow the cells to harden in the collapsed state; and (4) removing the compression so that the cell structure remains in the collapsed state. Table 3, below, provides example parameters for forming cushioning members of different thicknesses using the heat press process 240a and the Phylon process 240b described above.

TABLE 3

Single-Stage Molding Process Examples

| Material Thickness | Process | Molding Temperature (° C.) | Material Core Temperature (° C.) | Mold Time (Seconds) | Cooling Temperature (° C.) | Cooling Time (Seconds) |
|---|---|---|---|---|---|---|
| 5-6 mm | Heat Press | 180 | 180 | 120 | Ambient | 1800 |
| 5-6 mm | Phylon | 165 | 140 | 390 | 30 | 390 |
| 10-16 mm | Phylon | 165 | 140 | 900 | 30 | 900 |
| 10-16 mm | Phylon | 180 | 140 | 900 | 30 | 600 |
| 10-16 mm | Phylon | 155 | 140 | 960 | 20 | 960 |

Although the molding processes 240a, 240b are described above as including a single-stage, wherein the precursor 302 is compressed from the initial thickness $T_I$ to the final thickness $T_F$ and heated at the molding temperature $t_M$ for a period of time, in some examples, the molding step 244a, 244b of the molding process 240a, 240b may be conducted in multiple stages. For example, the precursor 302 may initially be compressed from the initial thickness $T_I$ to an intermediate thickness that is greater than the final thickness $T_F$, and held at the molding temperature $t_M$ for a first molding period. After the first molding period, the precursor 302 is compressed to the final thickness $T_F$ and held at the molding temperature $t_M$ for a second molding period. In some examples, the multi-stage molding process 240a, 240b may include a standing period between each molding period. For example, after the first molding period, the precursor 302 may be cooled and allowed to sit in a relaxed state (i.e., no pressure applied) for an extended period of time (e.g., 24 hours). After the standing period, the precursor 302 is subjected to the second molding period to transition the precursor to the final thickness $T_F$. Alternatively, the precursor 302 may remain compressed at the intermediate thickness during the standing period. Table 4, below, provides an example comparison between the aforementioned multi-stage molding process and the single-stage molding process described above.

TABLE 4

Single-Stage v. Multi-Stage Molding Process Examples

| Process | Initial Thick. (mm) | First Mold. Temp. (° C.) | First Mold. Period (seconds) | First Mold Thick. (mm) | Standing Time | Second Mold. Temp. (° C.) | Second Mold. Period (Seconds) | Second Mold. Thick. (mm) |
|---|---|---|---|---|---|---|---|---|
| Single Stage | 25 mm | 180 | 300 | 10 | n/a | n/a | n/a | n/a |
| Two Stage | 25 mm | 180 | 180 | 16 | 24 hr | 180 | 180 | 10 |

After completion of the molding process 240, the physical properties of the precursor material (Table 1) are transformed as a result of the compression and transformation of the precursor material to the pre-collapsed structure. Examples of material properties of the pre-collapsed precursor material are provided in Table 5 below.

TABLE 5

Pre-Collapsed Material Physical Properties

| Property | Value |
|---|---|
| Durometer (Asker C) | 6.00-23.00 |
| Elongation (%) | ≥90.00 |
| Tensile Strength (kg/cm$^2$) | ≥6.00 |
| Tear Strength (kg/cm) | ≥2.00 |
| Split Tear Strength (kg/cm) | ≥0.15 |
| Specific Gravity | 0.10-0.25 |

Figure 2:
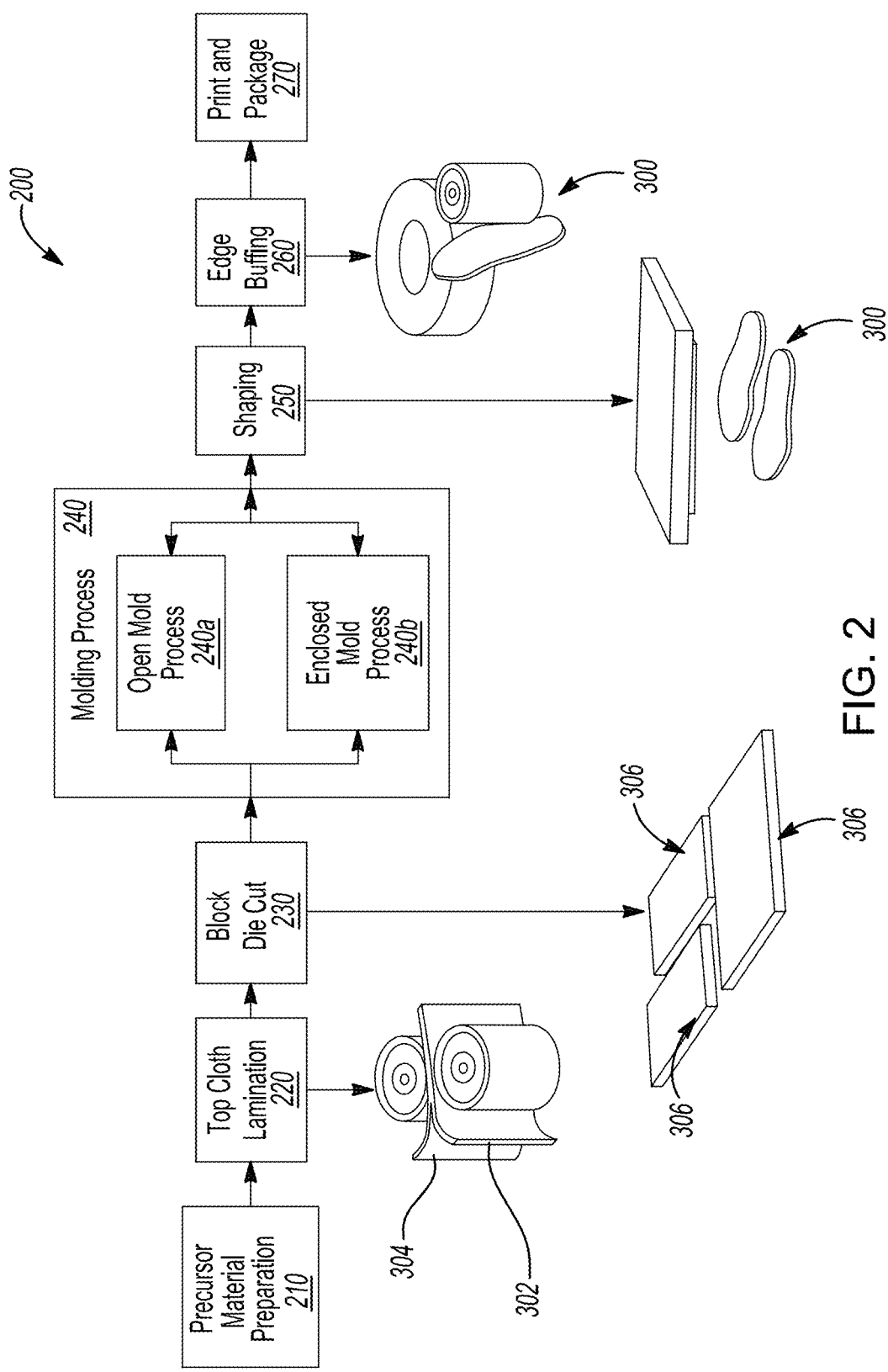
FIG. 2 is a schematic diagram of a method of producing a cushioning member in accordance with the principles of the present disclosure.

With continued reference to FIG. 2, once the molding process 240 is completed, the molded cushioning members 300 proceed to a shaping step 250 and are removed from the precursor blank 306. In some examples, the cushioning members 300 may be die cut. However, other methods of cutting, such as CNC cutting devices (e.g., cutters, lasers, waterjets, etc.) may be utilized. The cushioning members 300 are then processed through an edge buffing step 260 to remove imperfections from an outer periphery of the cushioning member 300. Finally, the cushioning members 300 are printed and packed at step 270 of the method 200.

As provided above with respect to conventional foam materials used in cushioning members, durability must often be sacrificed for the sake of providing improved comfort, and vice versa, as foams having a greater density are less likely to densify and stiffen with repeated use, but are less forgiving to the foot, while foams having a lower density are more forgiving, but more likely to deteriorate over time. This zero-sum relationship between durability and comfort for foam materials is eliminated by the method 200 described above, whereby the microstructure of the foam at the bubble or cell level is altered, thereby changing the physical properties of the foam and enabling soft, yet durable low-density foams. Reforming the foam cell structure from round or polyhedral shapes to a pre-collapsed, hinged state facilitates a more robust, durable response to cyclic fatigue under repeated compression events. Additionally, pre-collapsing the foam alters the feel of the foam by changing the amount of force required to move or displace that foam in compression. By subjecting the precursor 302 to the aforementioned method 200, at least four primary goals are accomplished: (1) removal of the initial stiffness region, providing softer feel and better conformability for increased comfort; (2) retention of the overall stiffness of the foam for ample support and cushioning; (3) changing the Poisson's ratio from a conventional—positive value to a near-zero value, so as to facilitate stress distribution under load in a way that conventional foams do not achieve; and (4) improvement of durability by eliminating cell collapse from available wear mechanisms.

Figure 8B:
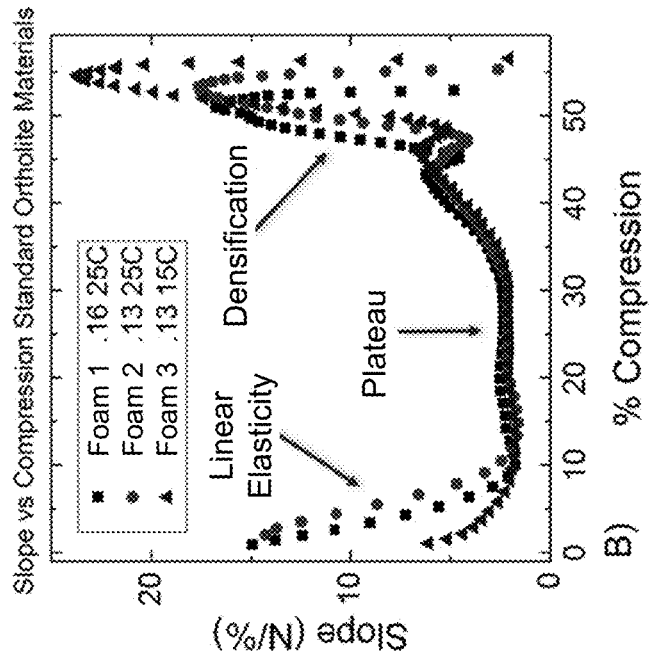
FIG. 8B is a slope-compression graph showing measured slopes of the force-compression graph of FIG. 8A for each of the three examples of the conventional foams.
Figure 8A:
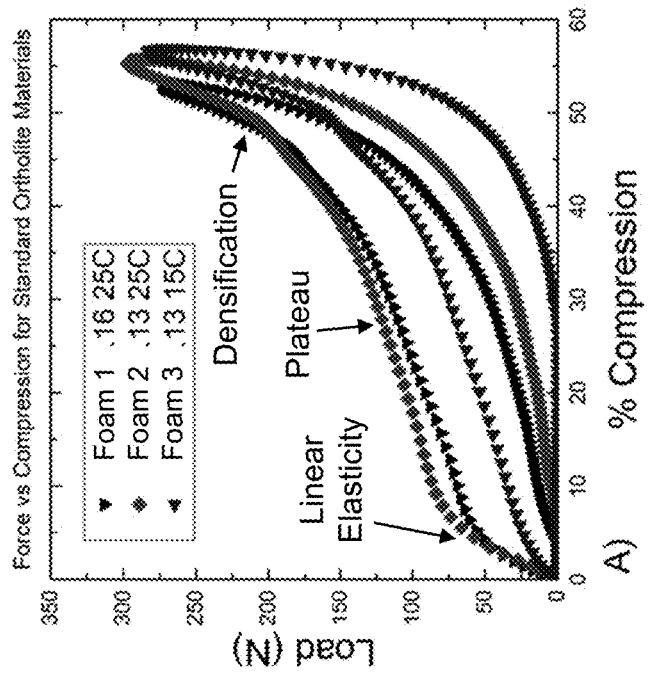
FIG. 8A is an example of a force-compression graph showing force-compression curves for three examples of conventional foam materials.
Figure 9B:
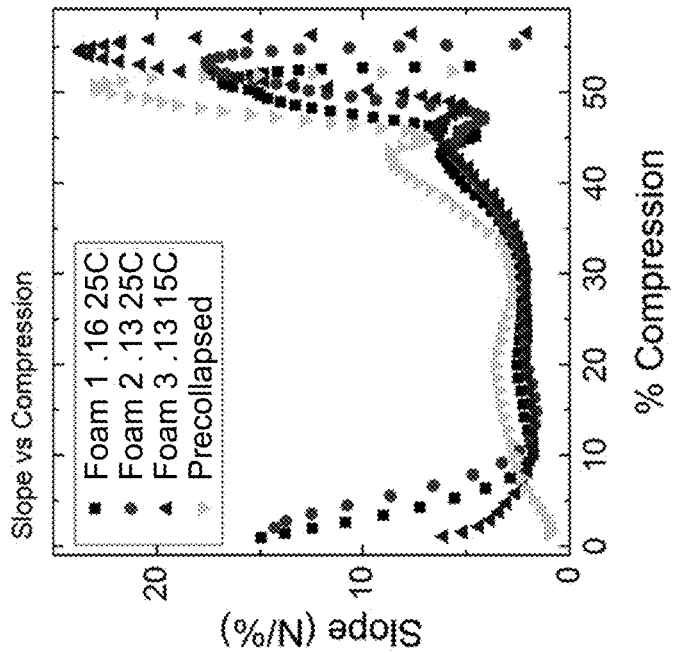
FIG. 9B is a slope-compression graph showing measured slopes of the force-compression graph of FIG. 9A for each of the foams.
Figure 9A:
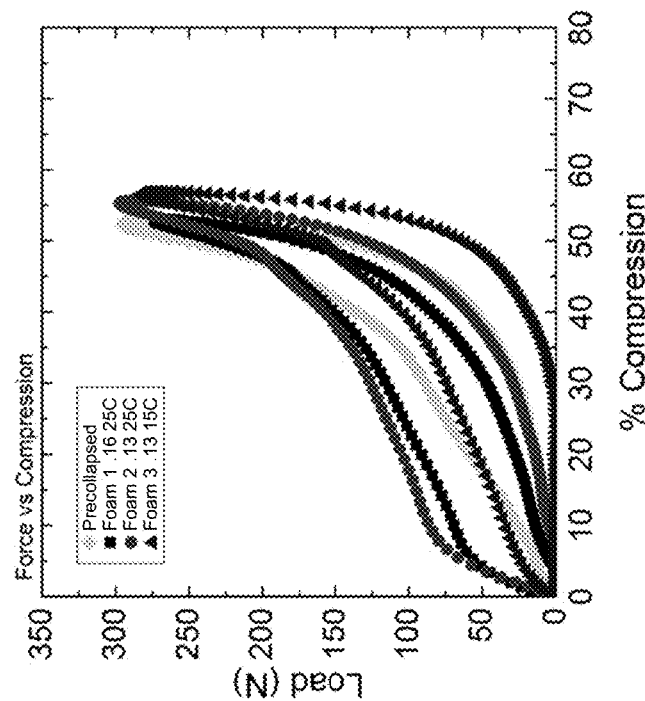
FIG. 9A is an example of a force-compression graph showing force-compression curves for three examples of conventional foam materials and a pre-collapsed foam material made in accordance with the principles of the instant disclosure.

With respect to improved comfort, FIGS. 9A and 9B compare foams created by the method 200 and the conventional foams of similar density and stiffness from FIGS. 8A and 8B. The plot in FIG. 9A shows that the disclosed method 200 is able to target the overall stiffness range appropriate for footwear applications, similar to conventional foams. However, in examining stiffness as a function of compression, as shown in FIG. 9B, it becomes clear that the foam of the instant disclosure demonstrates a much softer initial response, indicative of the new collapsed cell structure. Lower stiffness in the low-strain region of the response curve reduce the overall energy required for compression of the foam. This means that foams produced using the method 200 of the instant disclosure compress further than conventional foams during use, creating greater contact with the foot and eliciting a softer feel.

In another method of illustrating the transformation of the physical properties of the precursor foam, and particularly, the improvement in comfort, additional testing was conducted to compare the stiffness of pre-collapsed foams against conventional foams. In the tests, foam specimens cut in the shape of a midsole component were used. The compressive forces were applied at a test location corresponding to a metatarsophalangeal joint (i.e., the ball) of the foot using a 5 mm diameter tap on an INSTRON 5965 machine. Each material specimen was subjected to ten cycles of preloading prior to a final compression. The preloading was conducted using a triangular wave at 50 mm per minute, with the load limited to 300 N. The final compression was performed after the preloading period at a loading rate of 100 mm per minute. The final compression would stop when the load satisfied a 300 N threshold.

Figure 10:
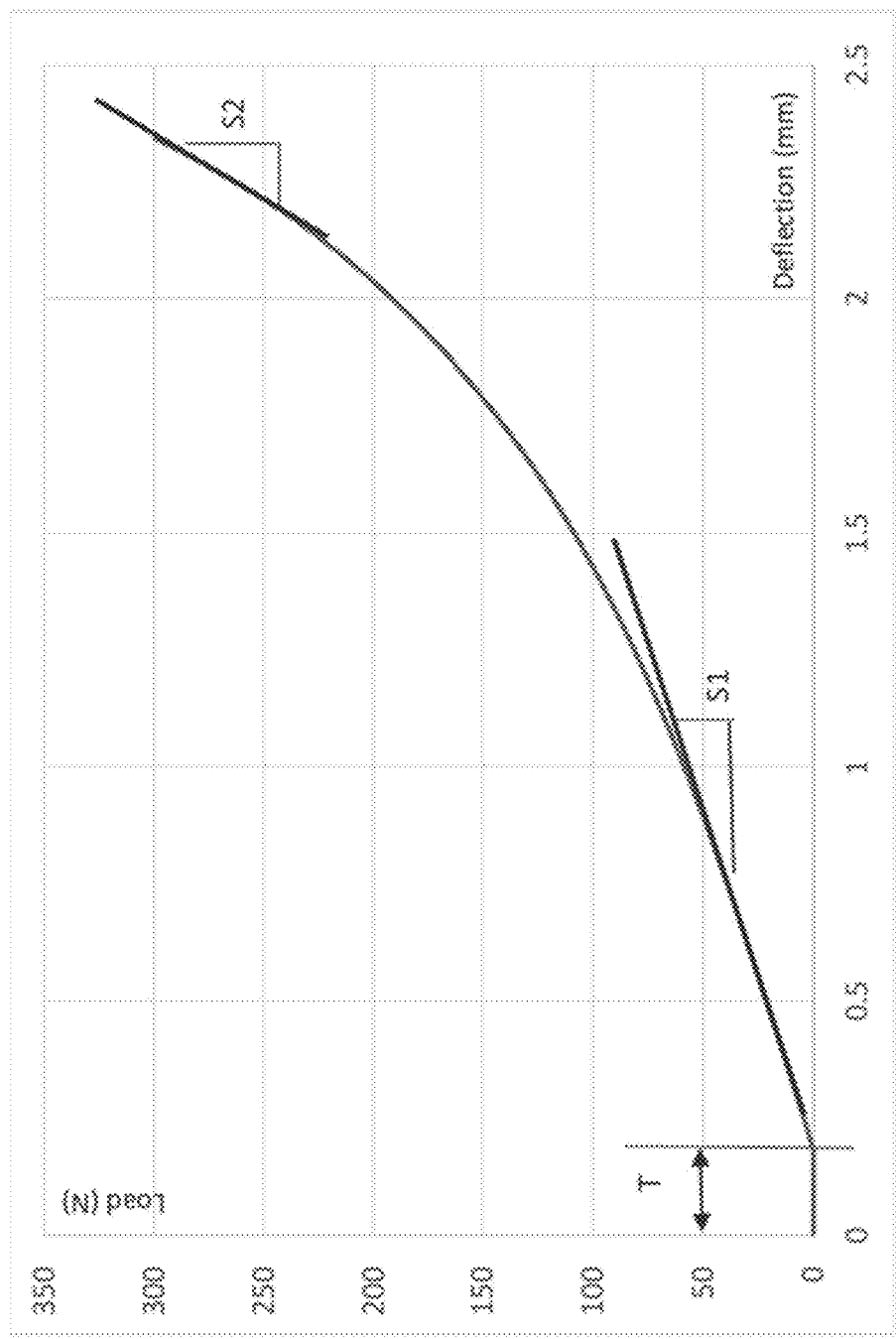
FIG. 10 is an example of a generic graph force-deflection curve for a stiffness test conducted on foams.

FIG. 10 shows a generic example of test data for the stiffness test, where the x-axis represents a total deflection in millimeters (mm) and the y-axis represents an applied load in newtons (N). Along the curve, the period T at the beginning of the curve represents an initial period after recovery from preloading where no load is applied. An initial stiffness S1 represents an average stiffness (load (N)/deflection (mm)) from 10 N to 50 N. A final stiffness represents an average stiffness (load (N)/deflection (mm)) of the foam material from 230 N to 280 N.

Figure 11:
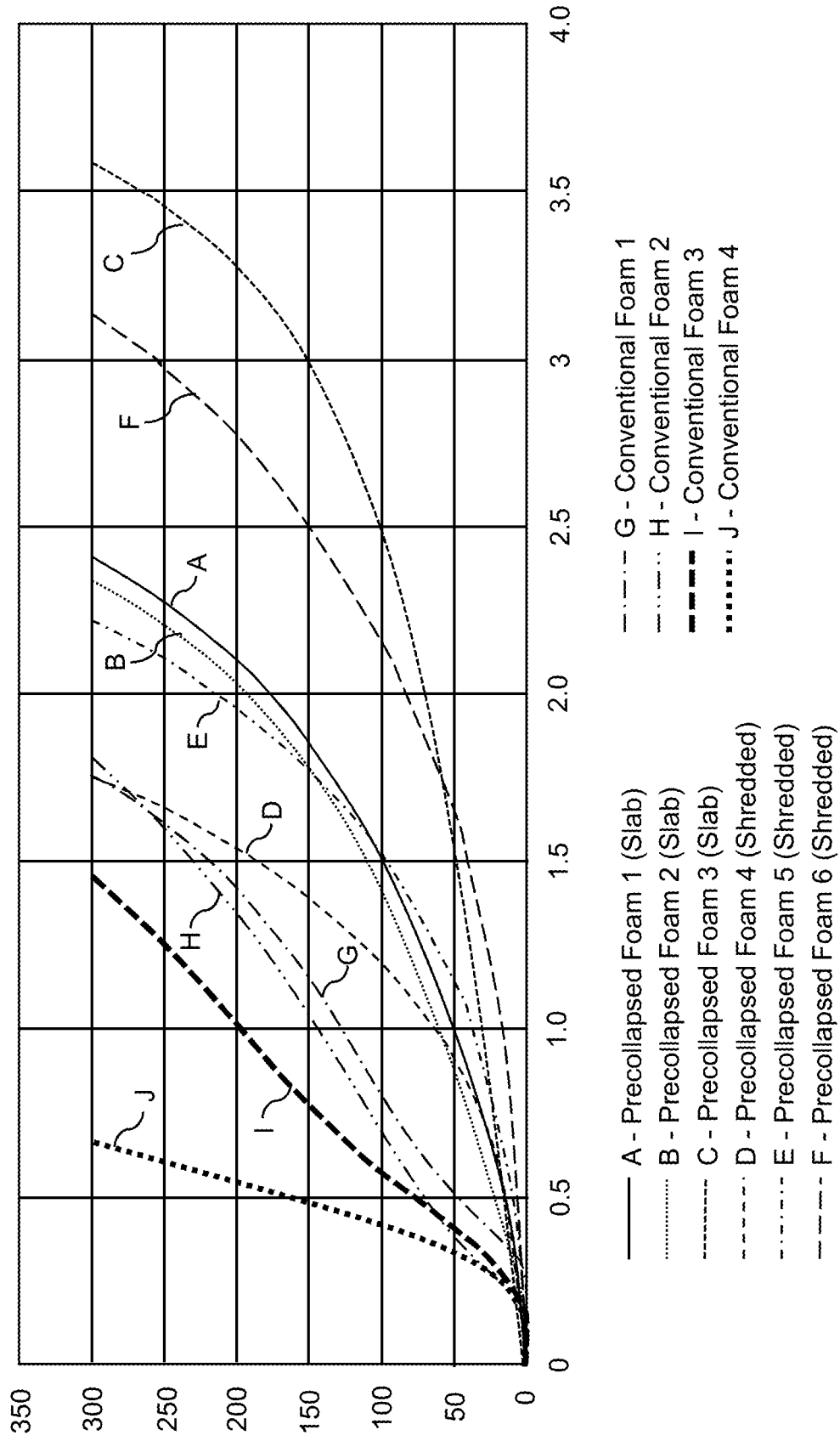
FIG. 11 is a graph showing force-deflection curves for stiffness tests conducted on various foams before and after application of the method of the present disclosure.

Referring now to FIG. 11 and Table 6 (below), test data for ten (10) material specimens is provided. As shown, Materials A-C represent examples where the precursor material was provided in a homogenous slab material form and processed according to the principles of the present disclosure, wherein the cell structures of the materials were pre-collapsed. Materials D-F represent examples where the precursor material was provided as a non-homogenous, composite material form and processed according the principles of the present disclosure, wherein the cell structures of the materials were pre-collapsed. Materials G-J represent examples of conventional foam materials having non-collapsed cell structures. Referring to the initial stiffness (S1) and the final stiffness (S2), Table 6 shows that the pre-collapsed foams (Materials A-F) exhibit substantially lower initial stiffness than the conventional foams (Materials G-J), regardless of whether the pre-collapsed material was provided in a slab form (Materials A-C) or a composite form (Material D-F). Particularly, each of the conventional foams exhibit an initial stiffness S1 of more than 200 N/mm, while each of the pre-collapsed foams exhibit an initial stiffness S1 of less than 75 N/mm. This is clearly illustrated in FIG. 11, where Materials A-C each follow relatively gradual curves representing lower initial stiffnesses.

TABLE 6

Stiffness of Pre-collapsed and Conventional Foams

| Material | Thickness (mm) | Max Compressive Strain (%) | T (ms) | S1 (N/mm) | S2 (N/mm) |
|---|---|---|---|---|---|
| A - Pre-collapsed (Slab) | 4.80 | 50.4 | 25 | 70.0 | 372.8 |
| B - Pre-collapsed (Slab) | 5.43 | 43.2 | 220 | 70.8 | 368.6 |
| C - Pre-collapsed (Slab) | 6.00 | 60.0 | 20 | 30.7 | 315.4 |
| D - Pre-collapsed (Composite) | 6.70 | N/A | N/A | 45.8 | 295.2 |
| E - Pre-collapsed (Composite) | 6.30 | N/A | N/A | 63.2 | 392.5 |
| F - Pre-collapsed (Composite) | 5.40 | N/A | N/A | 84.9 | 469.0 |
| D - Conventional (Slab) | 5.34 | 33.1 | 330 | 223.6 | 326.0 |
| E - Conventional (Slab) | 5.20 | 34.9 | 200 | 220.0 | 233.8 |
| F - Conventional (Slab) | 5.30 | 27.6 | 190 | 233.4 | 238.7 |
| G - Conventional (Slab) | 4.90 | 13.7 | 170 | 336.6 | 830.6 |

In addition to improved comfort, the pre-collapsed foam materials produced according to the method 200 of the instant disclosure exhibit improved conformability in comparison to conventional foams. The collapsed cell structure imparted by the method 200 influences the way the cell walls deform during compression of the foam. This is evidenced by a change in the Poisson's ratio of the foams after processing. Poisson's ratio indicates a material's tendency to retain its volume during deformation. A Poisson's ratio of 0.5 corresponds to perfect conservation of volume. That is, if the material is compressed in one direction, it increases its dimensions in each other direction appropriately to conserve volume. A Poisson's ratio of 0.0 indicates that deformation in one direction produces no complementary effect in each other direction.

In testing, Poisson's ratio was calculated from strain measurements obtained via an ARAMIS 4M Digital Image Correlation (DIC) system produced by Trilion Quality Systems Inc. Foam samples were die cut into 1.5" diameter cylinders from foam sheets between 0.4" and 1" thickness. The DIC pattern is applied to the foam via spray paint, with feature size of approximately 0.25 mm. Foam cylinders were compressed between two 40 mm compression platens in an Instron 8511. Strain data was recorded for five sinusoidal compression cycles from 0 to 50% compression at 1 Hz. Poisson's ratio was calculated from strain data corresponding to the fifth compression cycle as follows. First, strain in the axial ($E_z$) and radial ($E_r$) directions of the cylinder are separately averaged over the visible surface of the foam. Poisson's ratio is then taken as the negative of the average radial strain ($E_{r\_Ave}$) divided by average axial strain ($E_{Z\_Ave}$).

$$\text{Poisson's ratio} = -(E_{r\_Ave}/E_{Z\_Ave})$$

Figures 12A, 12B, 12C:
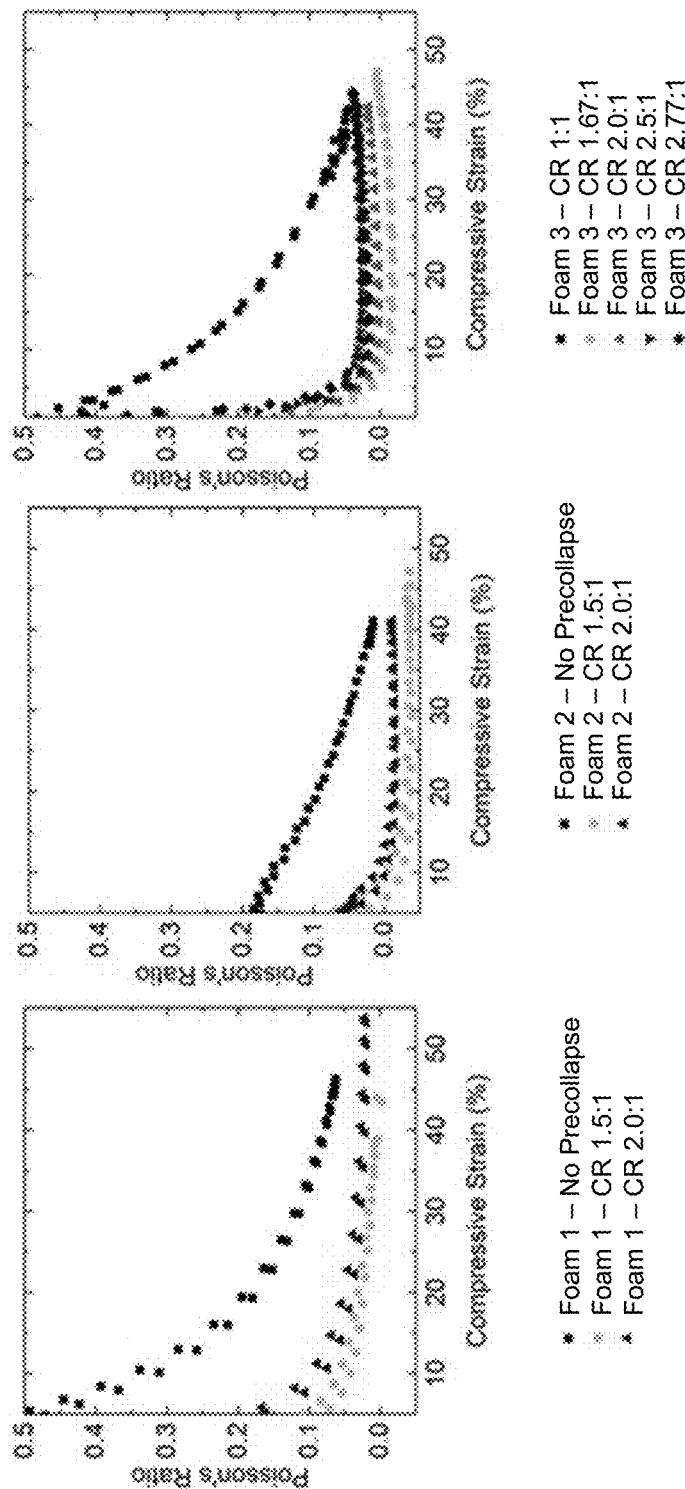
FIGS. 12A-12C are graphs showing the relationship between compressive strain and Poisson's Ratio for various foams before and after application of the method of the present disclosure.

FIGS. 12A-12C show that the conventional foam materials (square data points) exhibit a Poisson's ratio at or near 0.5 for low-strain compression. However, as strain is increased, the Poisson's ratio drops as the cell walls begin to collapse. This inward collapse reduces the outward deformation resulting from the compression and therefore reduces the Poisson's ratio observed. In contrast, the pre-collapsed foams (triangle, circle, and diamond data points) exhibit near-zero Poisson's ratio from low strain to high strain. This near-zero Poisson's ratio is due to the pre-collapsed structure of the cells allowing them to immediately undergo further collapse during compression. This tendency toward densification is responsible for the near-zero Poisson's ratio behavior.

Figure 13B:
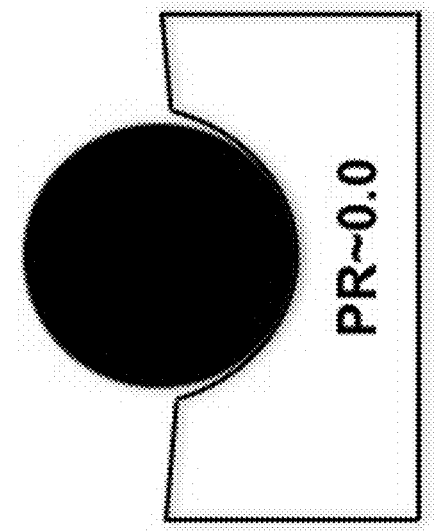
FIGS. 13A and 13B are schematic diagrams showing an example of the effect of the method of the present disclosure on the Poisson's ratio of a material.
Figure 13A:
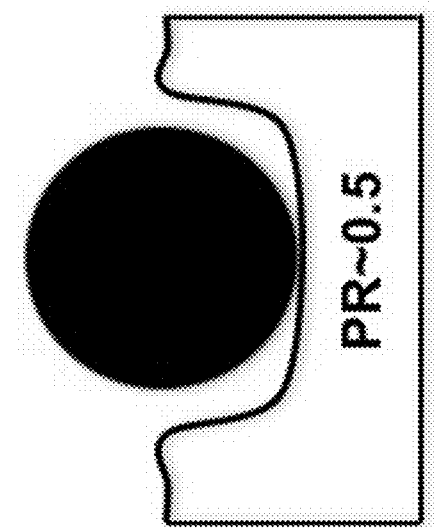

The Poisson's ratio of a material influences its ability to conform to curved surfaces, such as the bottom of a foot. FIGS. 13A and 13B demonstrate the difference in deformation behavior for materials with Poisson's ratio ~0.5 (FIG. 13A) and Poisson's ratio ~0.0 (FIG. 13B) compressed with a curved indenter. For Poisson's ratio of approximately ~0.5, compression underneath the indenter causes material to deform outward away from the indenter due to conservation of volume. For Poisson's ratio ~0.0, compression by the indenter does not cause radial deformation in the material, thereby promoting conformity between the indenter and the material. For footwear, this increased contact area will provide the sensation of a better fit.

Figure 15A:
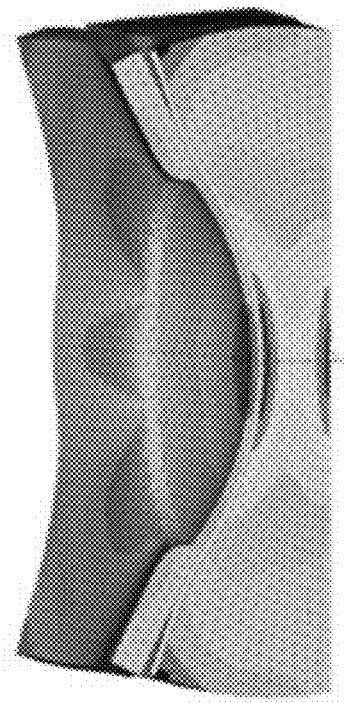
FIGS. 15A and 15B are finite element analysis models of a sole structure having a sockliner formed of a pre-collapsed foam made in accordance with the principles of the present disclosure.
Figure 15B:
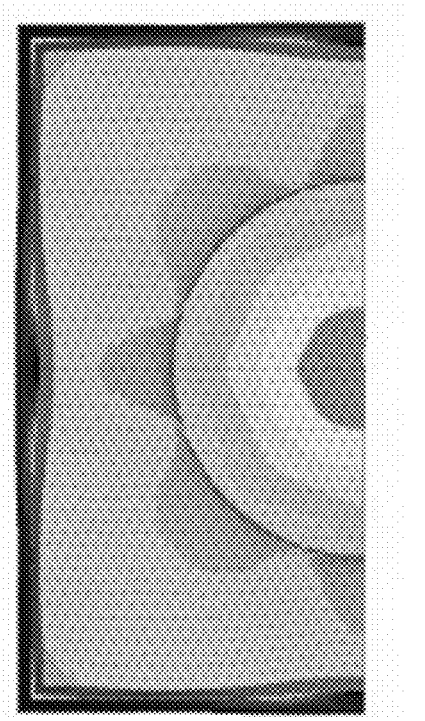
Figure 14A:
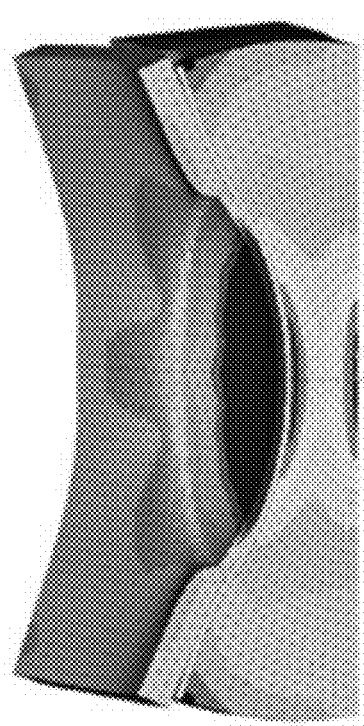
FIGS. 14A and 14B are finite element analysis models of a sole structure having a sockliner formed of a conventional foam material.
Figure 14B:
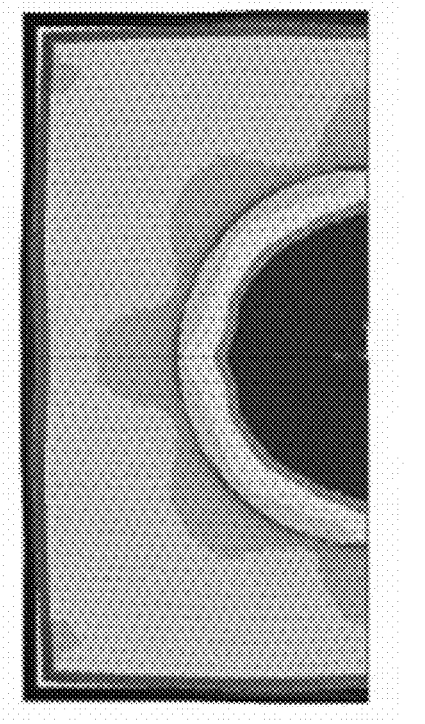

Knowing the material density, strain dependent modulus of the material from the F-d data, and the Poisson's ratio allows the materials to be numerically modeled to simulate their behavior during deformation under load. FIGS. 14A and 14B show finite element analysis (FEA) models for a sockliner formed using conventional foams having a Poisson's ratio of approximately 0.5, whereas FIGS. 15A and 15B show FEA models for an insole 26 formed of foams made using the method 200 of the instant disclosure. As shown in FIGS. 14A-15B, the finite element analysis (FEA) models show the exact same behavior illustrated in the corresponding diagrams of FIGS. 13A and 13B, namely, a greater degree of curvature following the indenting surface (e.g. the heel, toe, etc.) and a reduction in the stress directly under the heel in part because of the greater contact area and ability to distribute that load. Accordingly, pre-collapsed foams produced according to the instant disclosure demonstrate a marked difference in behavior, reducing stress and providing higher contact area.

The method 200 of the instant disclosure also produces foams with improved durability. With continued reference to FIGS. 8A and 8B, conventional foams exhibit a three-stage mechanical response during compression caused by cell collapse and densification. For traditional foams in a footwear application, normal use requires compression past the point of the collapse hundreds of thousands of times. Because cell collapse occurs via cell wall buckling, high local strains are produced in the cell walls, which result in plastic deformation of the polymer material. This means that permanent deformation occurs and the shape and mechanical response of the foam drifts over time.

Figures 16A, 16B:
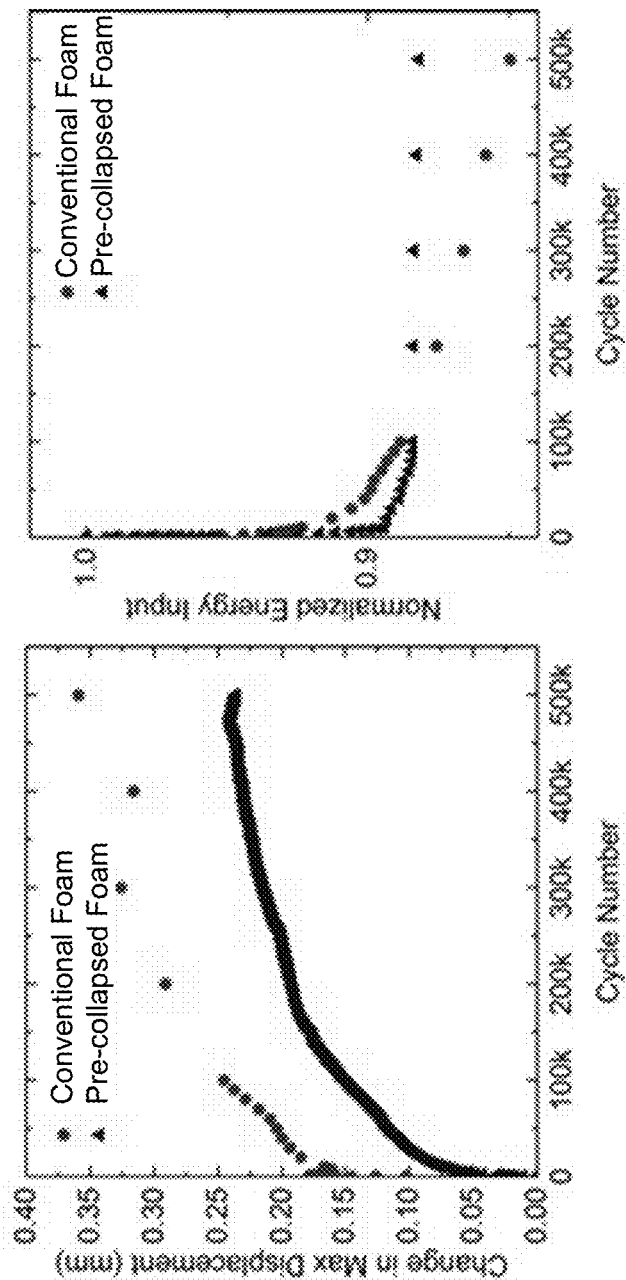
FIGS. 16A and 16B are graphs showing the relationship between max displacement and compression energy for pre-collapsed vs. conventional foams.
Figure 17A:
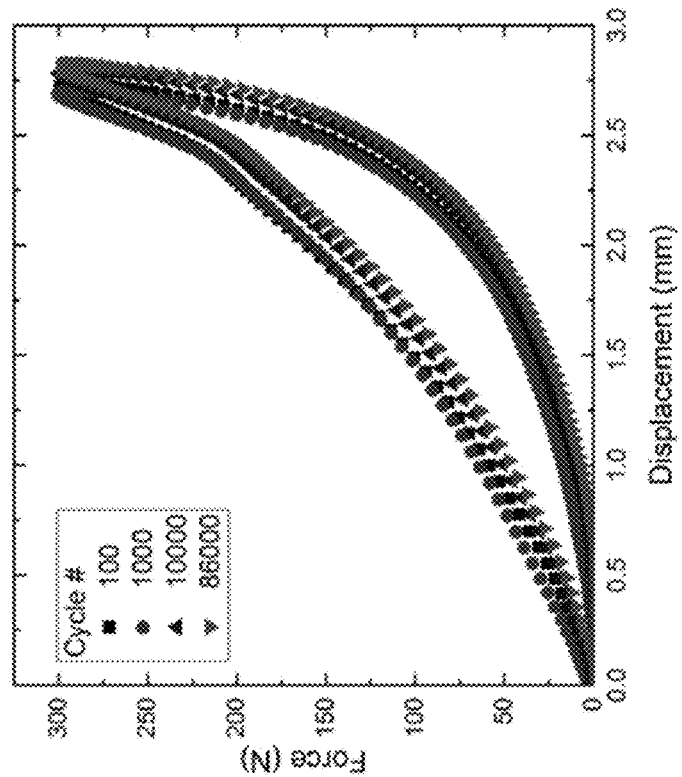
FIGS. 17A and 17B are graphs showing the change in relationship between force and displacement as a result of cyclic compression for pre-collapsed and conventional foams.
Figure 17B:
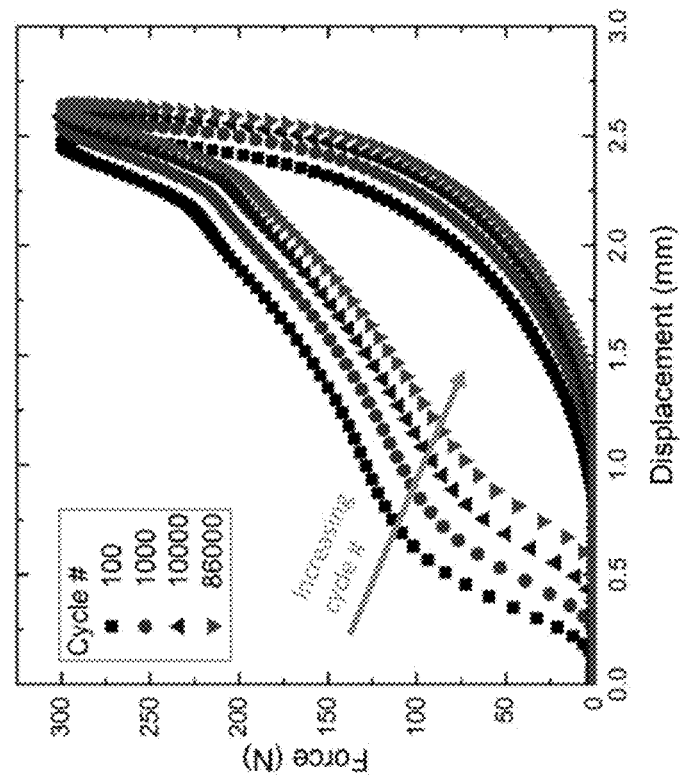

Pre-collapsing the cell structure according to the method 200 of the instant disclosure permanently buckles the cell walls. Therefore, the cells do not pass back and forth between a buckled state and un-buckled state during use, and plastic deformation is minimized. This results in a more durable foam with a consistent mechanical response over hundreds of thousands of cycles. Durability was characterized by conducting cyclic dynamic testing according to the procedure outlined previously. Each material was subjected to 500,000 continuous cycles. FIG. 16A shows that foams formed using the method 200 (triangle data points) experience a smaller drift in maximum displacement over the course of the test as compared to a conventional foam (circle data points) of similar density and stiffness. This suggests a smaller change in the thickness of the sample over time. Similarly, FIG. 16B shows that the energy required to compress the pre-collapsed foam formed using the method 200 (triangle data points) to the target load remains relatively constant compared to the conventional foam material having similar density and stiffness (circle data points). The data of Table 16B indicates that the shape of the force versus displacement curve is not changing appreciably over the course of the test. This is clearly illustrated by FIGS. 17A and 17B, where FIG. 17A shows that the force-displacement curve for conventional foam material shifts significantly over the course of 86,000 compression cycles, while the force-displacement curve for pre-compressed foam material remains relatively constant over the course of 86,000 compression cycles. Put in layman's terms, the pre-compressed foam material remains consistent in its mechanical response, or "feel," over the totality of its use window from low strain to high strain. The improved durability and extended lifecycle can be confirmed visually by the condition of the two materials pre- and post-testing. Where the conventional foam material was cracked and densified by the indenter, the pre-collapsed foam material of the instant disclosure showed only a subtle dimple from the indenter.

The methods and processes described above advantageously alter the microstructure of the foam at the bubble or cell level, thereby changing the foams physical properties and enabling soft, yet durable low-density foams. Reforming the foam cell-structure from round or polyhedral shapes to a collapsed-hinged state facilitates a more robust, durable response to cyclic fatigue under repeated compression events and, additionally, it alters the feel of the foam by changing the amount of force required to move or displace that foam in compression.

The following Clauses provide exemplary methods for making a cushioning member or a sole structure for an article of footwear, as described above.

Clause 1: A method of forming a polymeric foam material comprising (i) providing a precursor material having a first thickness, the precursor material being an open-cell foam material, (ii) applying a uniaxial compressive force to the precursor material to compress the precursor material to a second thickness, the compressive force causing a cell structure of the precursor material to collapse, (iii) heating the precursor material at a molding temperature for a first time period while the compressive force is applied, the first time period being sufficient to heat the precursor material to a softening temperature, (iv) removing the compressive force from the precursor material, and (v) maintaining the cell structure of the precursor material in a collapsed state.

Clause 2: The method of Clause 1, wherein a ratio of the first thickness to the second thickness is at least 1.5:1.

Clause 3: The method of Clause 1, wherein the second thickness ranges from 4 mm to 6 mm.

Clause 4: The method of Clause 1, wherein the molding temperature ranges from 120° C. to 400° C.

Clause 5: The method of Clause 1, wherein the first time period ranges from 120 seconds to 1100 seconds.

Clause 6: The method of Clause 1, wherein the precursor material is low-density, open-cell polyurethane foam.

Clause 7: The method of Clause 1, further comprising cooling the precursor material at a cooling temperature for a second time period while the compressive force is applied, the cooling temperature being less than the softening temperature.

Clause 8: The method of Clause 7, wherein the cooling temperature ranges from 0° C. to 10° C.

Clause 9: The method of Clause 8, wherein the first time period is sufficient to heat the precursor material above a softening temperature of the precursor material and the second time period is sufficient to cool the precursor material below the softening temperature.

Clause 10: The method of Clause 1, wherein the compressive force is a pressure of approximately 30 kilograms per square centimeter.

Clause 11: A method of forming a cushioning member for an article of footwear, the method comprising (i) providing precursor material having a first thickness, the precursor material being an open-cell foam material, (ii) applying a uniaxial compressive force to the precursor material to compress the precursor material to a second thickness, the compressive force causing cell structures of the precursor material to move to a collapsed state, (iii) heating the precursor material to a first temperature above a softening temperature of the precursor material while maintaining the cells structures in the collapsed state, and (iv) cooling the precursor material to a second temperature below the softening temperature of the precursor material while maintaining the cell structures in the collapsed state.

Clause 12: The method of Clause 11, wherein a ratio of the first thickness to the second thickness is at least 1.5:1.

Clause 13: The method of Clause 11, wherein the second thickness ranges from 3 mm to 25 mm.

Clause 14: The method of Clause 11, wherein the precursor material is heated at a molding temperature ranging from 140° C. to 400° C.

Clause 15: The method of Clause 11, wherein the precursor material is heated for a time period ranging from 120 seconds to 1100 seconds.

Clause 16: The method of Clause 11, wherein the precursor material is low-density, open-cell polyurethane.

Clause 17: The method of Clause 11, wherein the precursor material is cooled at a cooling temperature ranging from 0° C. to 10° C.

Clause 18: The method of Clause 11, wherein the compressive force is a pressure of 30 kilograms per square centimeter.

Clause 19: The method of Clause 11, further comprising shaping the precursor material into the shape of one of a sockliner, an insole, a midsole, a cushioning insert, and an outsole.

Clause 20: The method of Clause 19, further comprising incorporating the cushioning member into the article of footwear.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method of forming a polymeric foam material comprising:
   providing a precursor material having a first thickness, the precursor material being a low-density, open-cell polyurethane;
   applying a compressive force to the precursor material to compress the precursor material to a second thickness, the compressive force causing a cell structure of the precursor material to collapse into a collapsed state, wherein the compressive force is a pressure of approximately 30 kilograms per square centimeter;
   heating the precursor material at a molding temperature for a first time period while the compressive force is applied, the first time period being sufficient to heat the precursor material to a softening temperature;
   cooling the precursor material at a cooling temperature for a second time period while the compressive force is applied to maintain the cell structure in the collapsed state; and
   removing the compressive force from the precursor material.

2. The method of claim 1, wherein a ratio of the first thickness to the second thickness is at least 1.5:1.

3. The method of claim 1, wherein the second thickness ranges from 3 mm to 25 mm.

4. The method of claim 1, wherein the molding temperature ranges from 120° C. to 400° C.

5. The method of claim 1, wherein the first time period ranges from 120 seconds to 1100 seconds.

6. The method of claim 1, wherein the cooling temperature is less than the softening temperature.

7. The method of claim 6, wherein the cooling temperature ranges from 0° C. to 10° C.

8. The method of claim 7, wherein the first time period is sufficient to heat the precursor material above a softening temperature of the precursor material and the second time period is sufficient to cool the precursor material below the softening temperature.

9. A method of forming a cushioning member for an article of footwear, the method comprising:
   providing precursor material having a first thickness, the precursor material being an open-cell foam material;
   applying a compressive force to the precursor material to compress the precursor material to a second thickness, the compressive force causing a cell structure of the precursor material to collapse into a collapsed state, wherein the compressive force is a pressure of approximately 30 kilograms per square centimeter;
   heating the precursor material to a first temperature above a softening temperature of the precursor material while maintaining the cell structure in the collapsed state;
   cooling the precursor material to a second temperature below the softening temperature of the precursor material while maintaining the cell structure in the collapsed state; and
   incorporating the precursor material into an article of footwear.

10. The method of claim 9, wherein a ratio of the first thickness to the second thickness is at least 1.5:1.

11. The method of claim 9, wherein the second thickness ranges from 3 mm to 25 mm.

12. The method of claim 9, wherein the precursor material is heated at a molding temperature ranging from 120° C. to 400° C.

13. The method of claim 9, wherein the precursor material is heated for a time period ranging from 120 seconds to 1100 seconds.

14. The method of claim 9, wherein the precursor material is low-density, open-cell polyurethane.

15. The method of claim 9, wherein the precursor material is cooled at a cooling temperature ranging from 0° C. to 10° C.

16. The method of claim 9, further comprising shaping the precursor material into the shape of one of a sockliner, an insole, a midsole, a cushioning insert, and an outsole.

17. The method of claim 9, wherein applying a compressive force to the precursor material includes applying a uniaxial compressive force to the precursor material.

* * * * *